United States Patent [19]

Collins

[11] 3,755,789

[45] Aug. 28, 1973

[54] EXPANDABLE COMPUTER PROCESSOR AND COMMUNICATION SYSTEM

[75] Inventor: Arthur A. Collins, Dallas, Tex.

[73] Assignee: Collins Radio Company, Dallas, Tex.

[22] Filed: Oct. 30, 1972

[21] Appl. No.: 302,147

Related U.S. Application Data

[63] Continuation-in-part of Ser. No. 74,783, Sept. 23, 1970, abandoned.

[52] U.S. Cl....... 340/172.5, 179/15 AL, 179/15 BV, 179/18 J

[51] Int. Cl............................. G06f 5/06, H04j 3/08

[58] Field of Search................. 340/172.5; 179/18 J, 179/15 AL, 15 AQ, 15 AT, 15 BS, 15 BV; 178/50; 325/15; 328/55, 60, 63

[56] References Cited

UNITED STATES PATENTS

| | | | |
|---|---|---|---|
| 3,437,755 | 4/1969 | Brown | 178/50 |
| 3,483,329 | 12/1969 | Hankins et al. | 169/15 AL |
| 3,529,089 | 9/1970 | Davis et al. | 179/15 AL |
| 3,534,264 | 10/1970 | Blasbatg et al. | 325/15 |
| 3,586,782 | 6/1971 | Thomas | 179/15 AL |
| 3,592,970 | 7/1971 | Cappetti et al. | 179/18 J |
| 3,596,000 | 7/1971 | Lutz et al. | 179/15 AQ |
| 3,597,549 | 8/1971 | Farmer et al. | 179/15 AL |
| 3,639,904 | 2/1972 | Arulpragasam | 179/15 AT X |
| 3,692,941 | 9/1972 | Collins et al. | 169/15 AL |
| 3,700,820 | 10/1972 | Blasbalg et al. | 179/15 BV |
| 3,135,947 | 6/1964 | Grondin et al. | 340/172.5 |
| 3,278,904 | 10/1966 | Lekven | 340/172.5 |
| 3,456,242 | 7/1969 | Lubkin et al. | 340/172.5 |
| 3,544,976 | 12/1970 | Collins | 340/172.5 |
| 3,560,937 | 2/1971 | Fischer | 340/172.5 |
| 3,573,752 | 4/1971 | Lyghounis | 340/172.5 |
| 3,659,271 | 4/1972 | Collins et al. | 340/172.5 |
| 3,665,405 | 5/1972 | Sanders et al. | 340/172.5 |
| 3,665,417 | 5/1972 | Low et al. | 340/172.5 |
| 3,680,056 | 7/1972 | Kropfl | 340/172.5 |
| 3,681,759 | 8/1972 | Hill | 340/172.5 |

*Primary Examiner*—Paul J. Henon
*Assistant Examiner*—Jan E. Rhoads
*Attorney*—Burce C. Lutz et al.

[57] ABSTRACT

A communications and computation system wherein the processors communicate with each other and with other devices via a loop of continuously circulating data. The loop of data is comprised of channels which are time multiplexed on a bit basis in a repeating sequence. Further loops may be made of data circulating at lower speeds by extracting one of the channels from the main loop. The processors may each have a further time division multiplex loop attached thereto wherein one of the processors monitors the errors in each of the remaining processors for providing a centralized indication of system errors.

11 Claims, 19 Drawing Figures

EXPANDABLE COMPUTER PROCESSOR AND COMMUNICATION SYSTEM

This application is a continuation-in-part of a previous application, Ser. No. 74,783, now abandoned, filed on Sept. 23, 1970 and assigned to the same assignee as the present invention. The added material was obtained from applications referenced in the original application and incorporated by reference therein and now added to this application to produce a composite of the information in one document.

This invention relates generally to electronics and more specifically to a computer system. Even more specifically, the invention relates to a computer system utilizing a plurality of processors with a minimum number of physical electrical connections.

Attempts in the prior art to connect more than two processors together to form a computer system has resulted in discouragement because of the large number of physical connections required. Further, there have been horrendous timing problems involved in keeping the various processors from interfering with one another. A patent providing an indication of some of the timing problems is an Oschner U.S. Pat. No. 3,348,210 issued Oct. 17, 1967.

The present invention on the other hand provides an improved communication system where a single cable is utilized to connect a plurality of processors and terminal devices such as storage units and input/output devices in series to minimize the physical connecting hardware. All of the devices are connected in a loop with a synchronizing device for eliminating timing problems. The information transmitted on this loop is time division multiplexed into a plurality of channels. With this type of connection, the system is expandable and the number of channels available for communication can be increased by merely increasing the speed of operation for transmitting data onto the system.

General patents are available to provide additional details as to the present invention and its operation. Examples are U.S. Pat. Nos. 3,681,759; 3,662,401; 3,692,941; and 3,659,271. Additional information may also be obtained from an application entitled "Terminal Unit Data Detection and Exchange Apparatus" by Arthur A. Collins et al., Ser. No. 74,670, filed Sept. 23, 1970 and now abandoned.

It is therefore an object of the present invention to provide improved computer apparatus.

Other objects and advantages of the present invention may be ascertained from a reading of the specification and appended claims in conjunction with the drawings wherein:

As may be ascertained from reading the above and the referenced patents and co-pending applications, the present invention is a system concept and is concerned with providing a simple yet effective method of communicating between various processors and devices. This is accomplished by utilizing a time division multiplex loop which provides a continuous circulation of data around the loop. Processors acting through associated terminal units as well as many devices acting through their terminal units are connected in series on the loop so that any processor can access any given time slot of the time division multiplexed data loop and can, through particular portions of the data loop, access any given device or other processor connected to the loop. Since some devices are relatively low speed compared with the speed of a processor, an auxiliary loop has been designed to operate off the main loop on a given channel and operate a plurality of lower speed devices.

In addition, where a device need be connected to only one processor, further time division multiplex (TDM) units may be connected to each of one or more of the processors in a manner shown and described in the referenced U.S. Pat. No. 3,544,976 patent.

Figure 1:
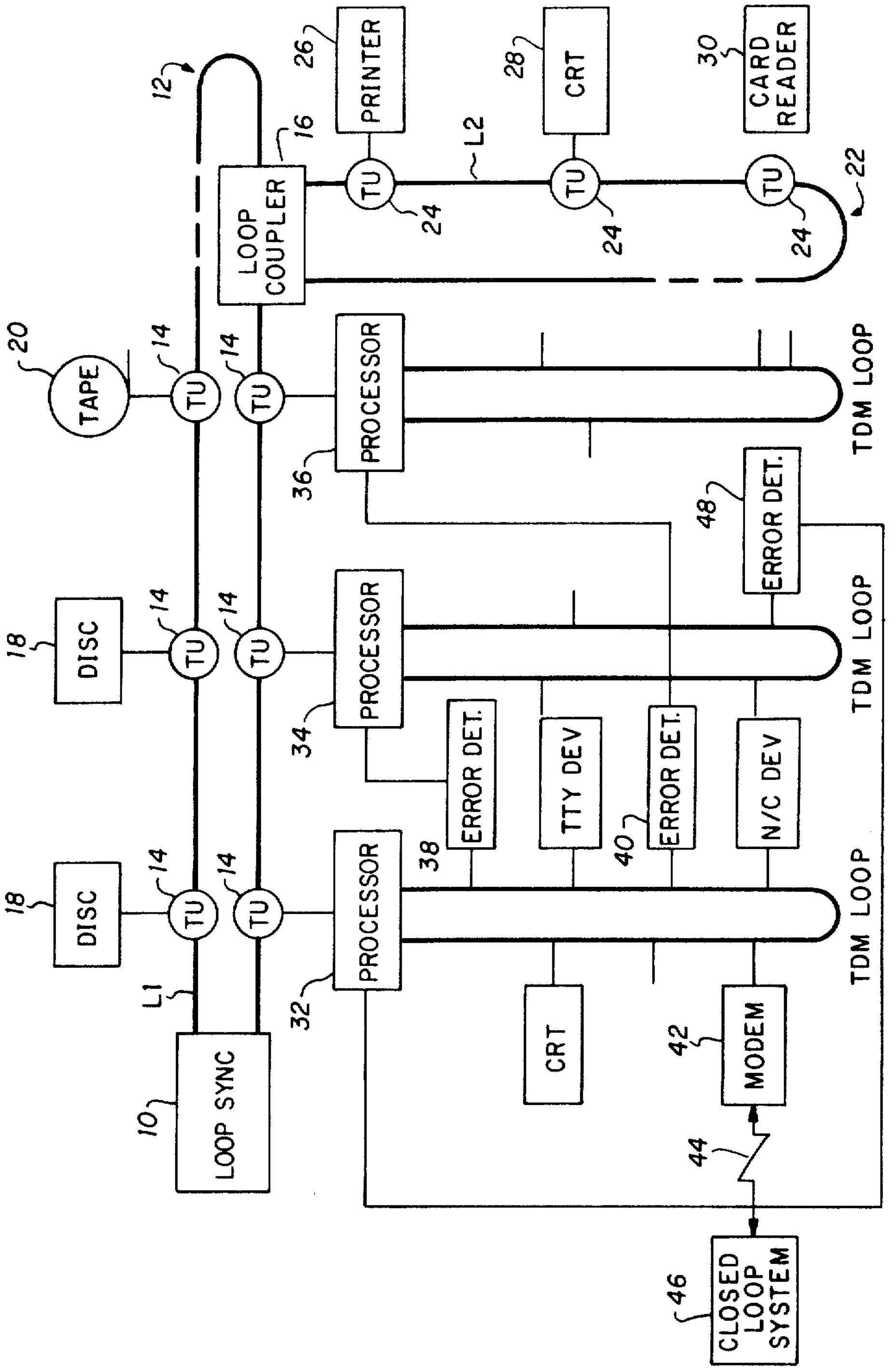
FIG. 1 is a block diagram of the overall system.

Referring now to FIG. 1, a loop synchronizer 10 is connected to a loop 12 having a plurality of terminal units 14 connected thereon. Also connected on loop 12 is a loop coupler 16. A pair of disc files 18 are connected to two of the terminal units 14 while a tape unit 20 is connected to a further terminal unit. The loop 12 is shown partially in dash line format to indicate that many more terminal units and associated devices such as printers, etc., may be attached to this loop. The loop 12 may be considered a main loop. An auxiliary loop, indicated as 22, is connected to loop coupler 16. On loop 22 are a plurality of terminal units 24. Connected to terminal units 24 are various load means such as a printer 26, a CRT 28, and a card reader 30. Connected to a few remaining terminal units 14 on the main loop 12 are a plurality of processors 32, 34, and 36.

Each of the processors 32–36 have a time division multiplex (TDM) loop as described in the last referenced patent. The TDM loop connected to processor 32 is illustrated as having a plurality of devices connected thereto. In particular there are error detectors 38 and 40 along with a modem 42. Modem 42 is connected via a transmission link 44 to a further closed loop system 46 which may be the same as the rest of FIG. 1. The time division multiplex loops connected to processors 34 and 36 would also have a plurality of devices connected thereto also, but only one device is shown for the purpose of simplicity. This device is an error detector 48 which is connected to the TDM of processor 34.

Figure 2:
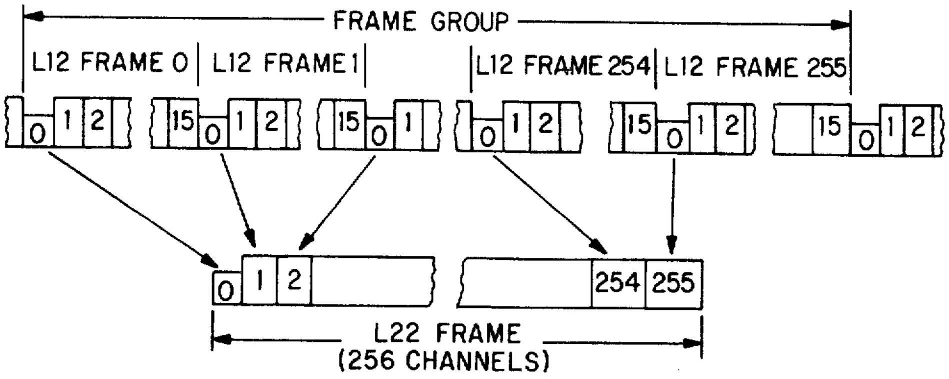
FIG. 2 is a waveform diagram showing the data frame relationships between the main and auxiliary loops.

FIG. 2 shows a plurality of bits of information in square wave format. In actuality each of these square wave bits is a bi-phase modulated signal which indicates whether or not each bit is a logic 1 or logic 0. Therefore, the half amplitude channel 0 bits still provide logic information while providing synchronizing information as amplitude modulation. This concept is further elaborated upon in several of the above-referenced applications.

One embodiment of the invention utilized bi-phase signals in the main loop and square wave signals in the auxiliary loop. However, this is merely a matter of implementation and has nothing to do with the basic invention. Therefore, further descriptions will not delve into the intricacies of the detection of the particular bits since this information, where pertinent, is adequately explained in the above-referenced copending applications.

In FIG. 2 it is shown that a particular frame of information contains 16 channels or time slots from 0 to 15. Although not shown, each set of 16 frames may be termed a frame sub-group while a plurality of 256 frames from 0 to frame 255 is entitled a frame group. All the data in a frame group continuously circulates loop 12 or the main loop. Loop 22 or the auxiliary loop on the other hand receives one bit out of each frame of the frame group from loop 12 in forming its information. As shown, the first bit of each frame is taken to provide data to loop 22. While the embodiment shown utilized 16 channels for a frame in loop 12, 256 channels were used for a frame in loop 22. The numbers are not binding and in fact further embodiments of the system are using more channels per frame in loop 12 while utilizing the same number of channels per frame in loop 22.

Figure 3:
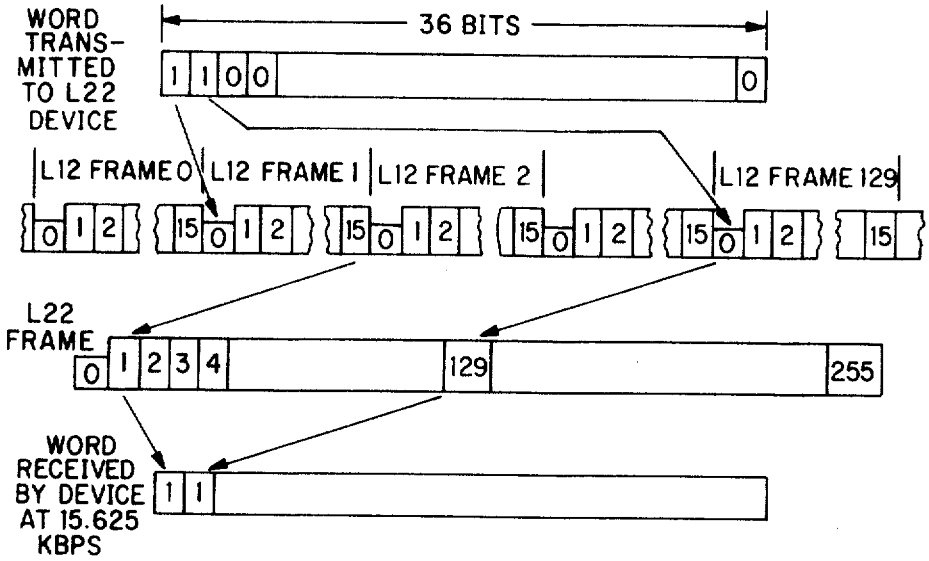
FIG. 3 is a set of waveforms showing the flow of data from the main loop to the auxiliary loop.

Referring now to FIG. 3 there is an illustration of a word formed in one of the processors such as 34 for transmittal to one of the devices on loop 22 such as CRT 28. This device is receiving information at 15.625 kilobits per second or in other words twice the frame rate of the loop 22. As may be ascertained by those skilled in the art, the transmitted word from processor 34 may occur at any time in a frame group so long as it always occurs at the proper time (the same channel) within a particular frame for transmission to the auxiliary loop. As shown, the first bit of the word to be transmitted occurred during frame 1 and was therefore placed in channel 0 of frame 1. The next bit, in order to have it received at the proper rate, occurred during frame 129 of loop 12. These bits are then extracted by the loop coupler and occur in the same corresponding position as bits 1 and 129 in the frame of loop 22. Every 128 bits, as time addressed in terminal unit 24 for CRT 28, a bit is extracted so that the transmitted word is formed in the CRT at exactly the same rate as it is placed on the loop 12.

Figure 4:
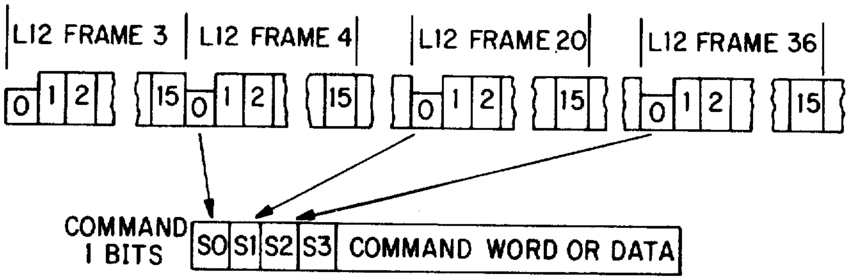
FIG. 4 is a set of waveforms showing the command channel word implementation technique.

Command words are required between the processors and between processors and associated devices for instructional and monitoring purposes. These command words are to be distinguished from working channel or data words in that they form messages which are very short (five words in one embodiment) compared to data word messages and are monitored by all devices of a particular class. In one embodiment the processors monitored the command channel every 16 bits as shown in FIG. 4 for commands from other processors. In the embodiment being described each of the terminal units monitored this same channel once each loop 12 frame group for bits of word supplying command data from a processor to a particular device.

DETAILED DESCRIPTION OF LOOP SYNCHRONIZER 10 OF FIG. 1

Figure 5:
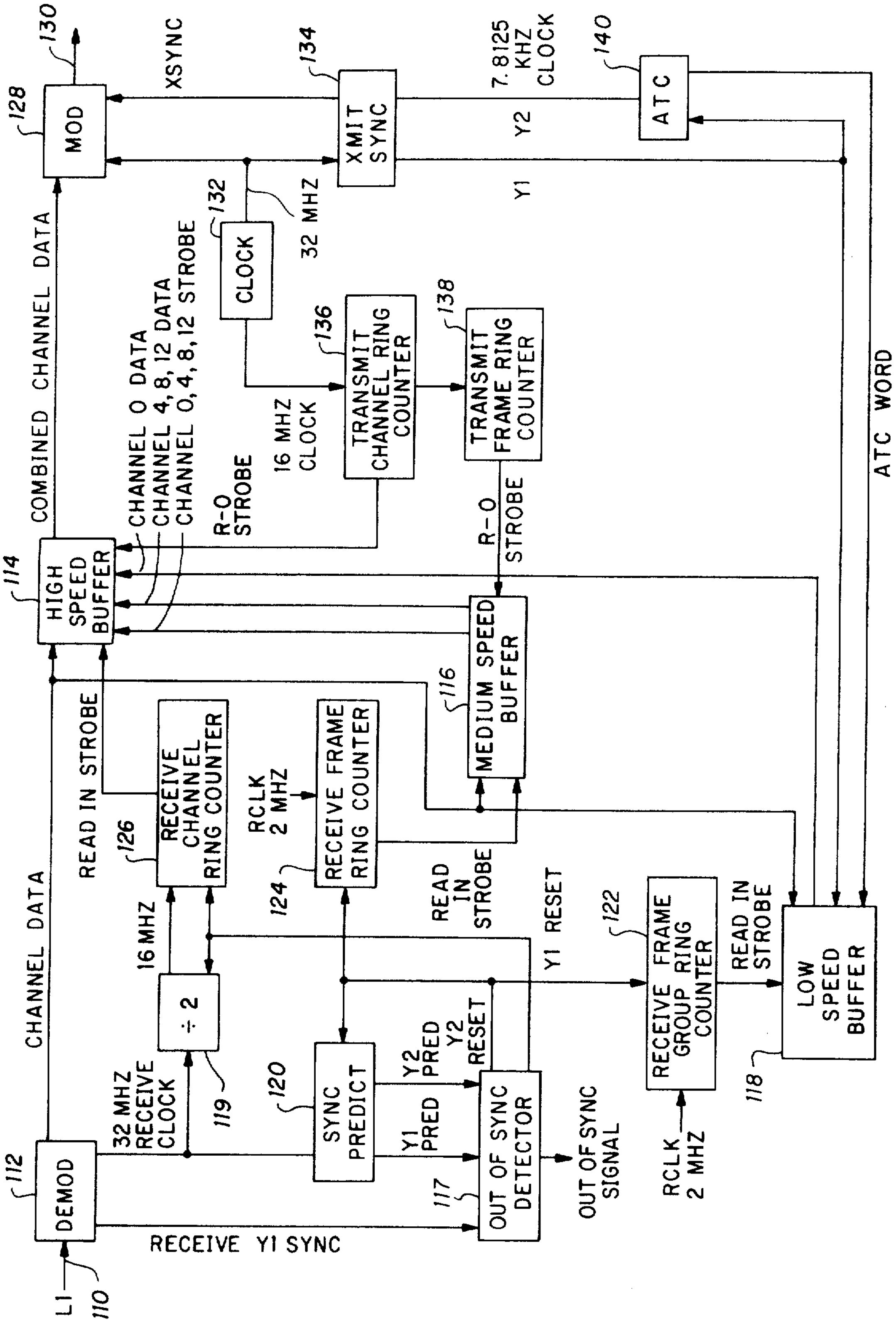
FIG. 5 is a block schematic diagram of the complete loop synchronizer.

In FIG. 5 input signals are applied at input terminal 110 which is also labeled L1 and is connected to a demodulator 112. Demodulator 112 has a channel data output supplied to a high speed buffer 114, to a medium speed buffer 116 and to a low speed buffer 118. Demodulator 112 further supplies Y1 sync pulses to an out-of-sync detector 117 and supplies 32 MHz receive clock signals to a divice-by-two network 119 and a sync predict circuit 120. The 132 MHz signals as well as any other frequencies or specific circuits mentioned in the specification are for explanatory purposes only as they were used in a particular embodiment of the invention and are not to be deemed restrictive. The sync predict circuit 120 supplies Y1 and Y2 predict signals to the out-of-sync detector 117 which supplies a Y2 reset output pulse to the sync predict circuit 120, to receive frame group ring counter 122 and to a receive frame ring counter 124. The out-of-sync detector 117 also supplies a Y1 reset pulse to the divide-by-two circuit 119 and to a receive channel ring counter 126. The divide-by-two circuit 119, after dividing the 32 MHz received clock, supplies this signal to the receive channel ring counter 126. Receive channel ring counter 126 provides a read in strobe to the high speed buffer 114. The receive frame ring counter 124 supplies a read in strobe pulse to the medium speed buffer 116. Two MHz RCLK pulses are supplied to a further input of receive frame group ring counter and to receive frame ring counter 124. An output of frame group ring counter 122 supplies a read in strobe to the low speed buffer 118. The high speed buffer 114 supplies an output containing the combined channel data to a modulator 128 which supplies a further output on lead 130. The modulator 128 is supplied with clock pulses from a clock means 132 which also supplies clock signals to a transmit sync 134 and to a transmit channel ring counter 136. The transmit channel ring counter supplies an output strobe to the high speed buffer 114 as well as supplying a clocking pulse to a transmit frame ring counter 138. Ring counter 138 supplies a read out strobe to medium speed buffer 116 which supplies a strobe to the high speed buffer 114 for channels 0, 4, 8, and 12. It also supplies data to the high speed buffer 114 for channels 4, 8, and 12. An output of the transmit sync 134 is supplied to clock an ATC or Absolute Time Clock block 140 as well as supplying synchronizing signals to the low speed buffer 118. A Y2 output from transmit sync 134 also supplies clocking signals to ATC block 140 at 7.8125 kHz. An output of ATC block 140 supplies an ATC word input to the low speed buffer 118. The low speed buffer 118 supplies an input to the high speed buffer 114 for channel 0 data. The out-of-sync detector 117 supplies a further output which provides an indication when the loop synchronizer is out of sync.

The various ring counters may be any applicable design such as shown in U.S. Pat. No. 3,639,740 titled "Ring Counter Apparatus" in the names of Watson and Escoffier.

LOOP SYNCHRONIZATION OPERATION

The operation of the loop synchronizer is relatively straight-forward in a broad sense in that it operates to take data received on terminal 110 and store it in the buffers 14, 16, and 18; and then retransmit this data through the auspices of modulator 128 to the output line 130 at a time later which corresponds with an integral number of data bit repetition periods after original transmission of data in that time slot.

The actual embodiment of the invention utilized bi-phase modulated and amplitude modulated data bit stream and therefore an explanation will be provided using this type of input as an example. However, the loop synchronizer is not limited to such waveforms and may be applicable to other types of data waveforms.

The incoming information is demodulated in 112 and all of the data bits are stored in buffer 114. The medium speed buffer receives all the data bits for channels 0, 4, 8, and 12 while the low speed buffer 118 receives only the data bits for channel 0. The reception of these data bits is obtained by the various read in strobes. In other words, the high speed buffer 114 is clocked every fourth data bit reception period and the low speed buffer 118 is clocked or strobed every 16th bit reception period.

The format of the data bits used in the overall loop to which the loop synchronizer is connected is that there are 16 channels of data with each particular channel occurring every 16 data bits. The 16 channels comprise a frame of channels. For every 16 frames a frame subgroup occurs. Every 16 frame subgroups or every 256 frames, a frame group occurs.

Using this information as background material it is desired to make the delay around a data loop equal to one or more integral numbers of frames of high speed information while the data in the medium speed buffer 116 is delayed one or more integral number of frame subgroups and while the data in the low speed buffer 118 is delayed one or more integral number of frame groups. The demodulator 112 takes the incoming signal and obtains from the amplitude modulated portion thereof a 32 MHz receive clock signal which is divided down to strobe the high speed buffer. The received information has two types of amplitude modulated synchronizing signals, one of which is indicative of the occurrence of a frame while the other is indicative of the occurrence of the end of a frame group. These two signals which are designated as Y1 and Y2, respectively, are utilized in a sync predict circuit 120 in combination with an out-of-sync detector 116 to reset the receive channel ring counter 126 to commence counting at the beginning of a frame thereby placing the first channel data bit in the first stage of the high speed buffer 114 and to reset the receive frame ring counter and the receive frame group ring counter so that they commence at the beginning of a frame group to start placing the first or channel 0 data bits in each of the medium speed and low speed buffers 116 and 118, respectively. In later operation it will be determined that the channel 0 data placed in each of the three buffers is transmitted out of only the low speed buffer 118 and is merely ignored by the buffers or registers 114 and 116 even though contained therein.

The clock for the entire loop is contained in block 132. Thus, this clock must be kept very stable. This clock produces the Y1 and Y2 signals which are received and demodulated at the end of the loop by demodulator 112. In operation the Y1 and Y2 signals may be divided out of the 32 MHz generated signal so that a Y1 pulse occurs every 16 data bits or clock pulses and Y2 occurs every 4,096 bits. The clock is applied directly to the modulator 128 so that each received bit of data is clocked out to line 130. The clock is also supplied to the transmit sync 134 which amplitude modulates certain data bits every 16 bits thereof and differently modulates every 4,096th bit to provide the coded frame group synchronization. The clock 32 also supplies signals to the transmit channel and frame ring counters 136 and 138 and through the transmit sync 134 supplies an output transmit signal to the low speed buffer 118. These clock signals are utilized by the associated buffer devices 114–118 to supply their stored signals to the modulator 28 at the appropriate time.

The ATC block 140 is not a necessary part of the invention but is provided merely to supply information as to time on a periodic basis for statistical and real time reference purposes.

DEMODULATOR

Figure 6:
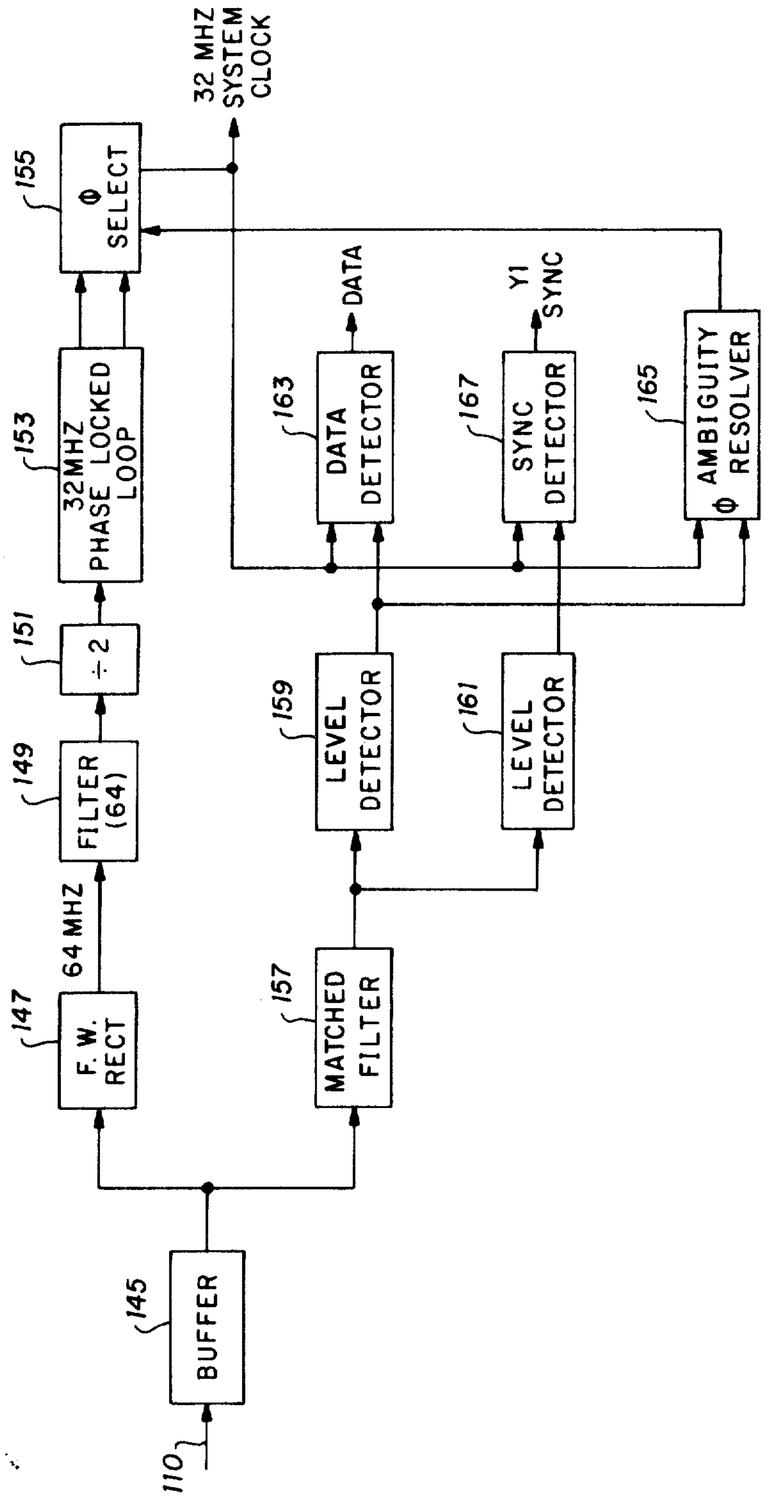
FIG. 6 is a block schematic diagram of the demodulator section of the loop synchronizer.

In FIG. 6 a detailed block diagram is shown of the demodulator 12 in FIG. 5. The incoming data on line 110 is basically that as shown in waveform A of FIG. 7. This data is isolated by buffer 145 and supplied to a full-wave rectifier 147 which produces a frequency doubling effect in the signal. This is filtered at 64 MHz by a filter 149 and then again divided by two in block 151 to supply a 32 MHz signal to a phase lock loop 153. This signal is full of harmonics and possible phase jitter caused by noise. However, the phase lock loop 153 removes the harmonics and phase jitter therefrom and supplies two out-of-phase signals to a phase select 155. These two out-of-phase signals are relatively free of the incoming harmonics. The signal from buffer 145 is also supplied to a matched filter 157 which alters the incoming signal from that shown in waveform A of FIG. 7 to that shown in waveform B of FIG. 7. The filter may be designed according to the principles outlined in various network synthesizing publications but primarily is a filter designed to have an impulse response of a single cycle of a sine wave. The output of filter 157 is supplied to a pair of level detectors 159 and 161. These two level detectors provide outputs when the inputs exceed different predetermined levels in either the positive or negative direction with respect to a reference. These levels may be shown or illustrated by the dash lines in waveforms B and R of FIG. 7 and the outputs of the level detectors are illustrated in waveforms C and S, respectively.

The output of level detector block 159 supplies an input to a data detector 163 and also supplies an input to ambiguity resolver 165. The level detector means 161 supplies an output to a sync detector 167 which receives an input from phase select circuit 155. Phase select circuit 155 also supplies inputs to data detector 163 and an ambiguity resolver 165, as well as providing a 32 MHz system clock output. All of the blocks referenced above are old in the art with the possible exception of blocks 163–167. These blocks will be explained further below.

AMBIGUITY RESOLVER

Figure 7:
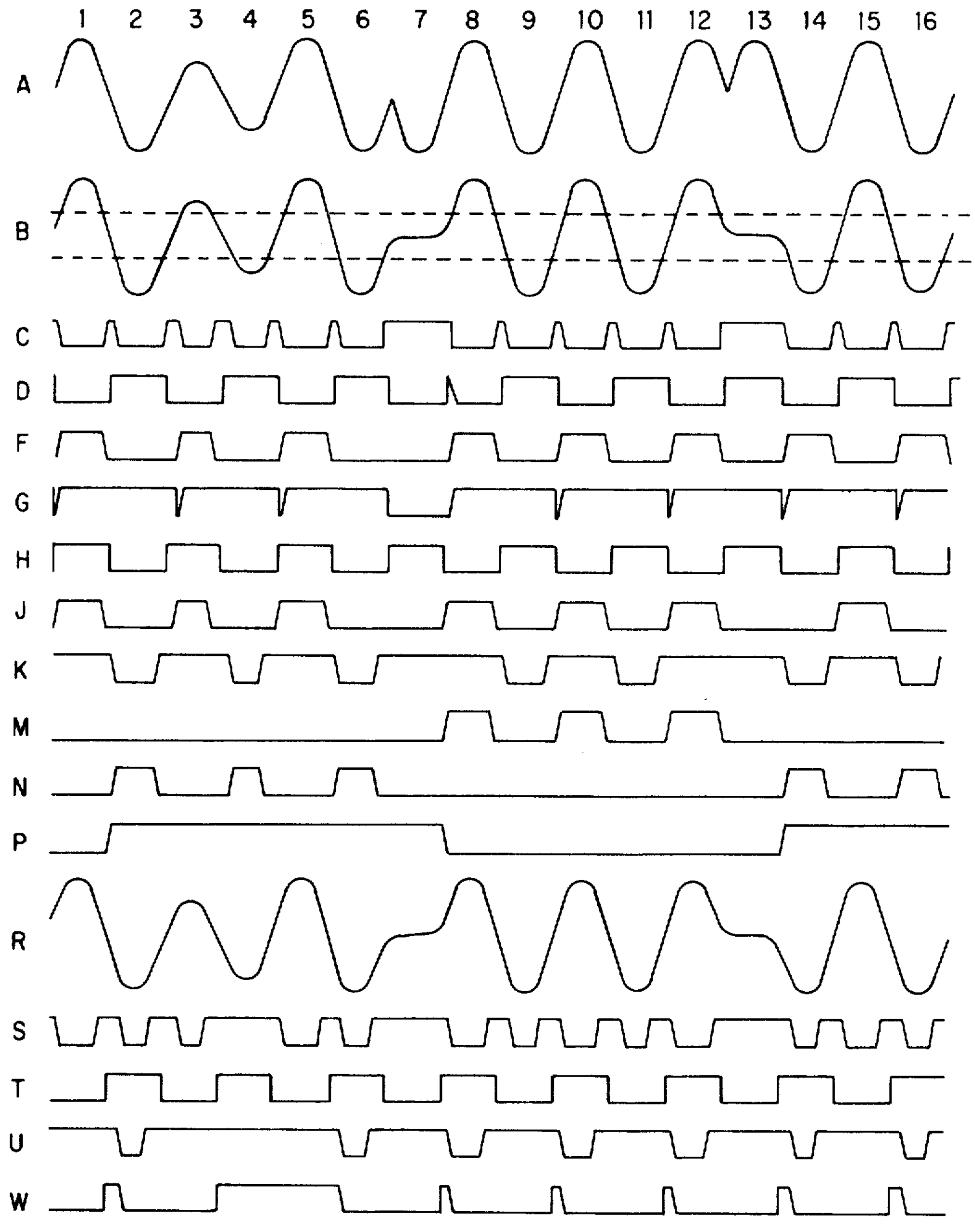
FIG. 7 is a set of waveforms for use in explaining FIGS. 5 and 6.
Figure 10:
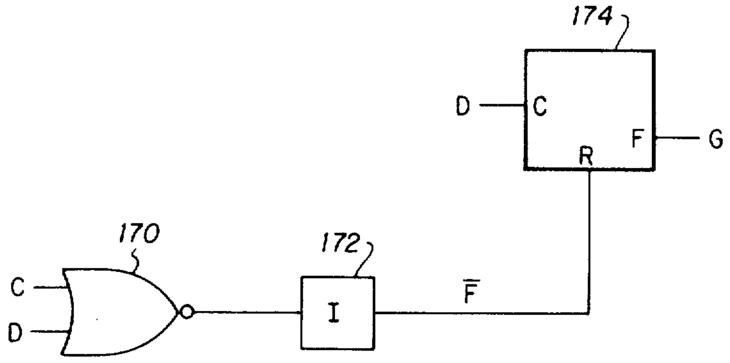
FIG. 10 is a detailed block diagram of the ambiguity resolver of FIG. 6.

The ambiguity resolver 65 will be better understood from a discussion of FIG. 7 and FIG. 10. The ambiguity resolver is designed to correct the phase of the system clock being supplied by the demodulator. If the phase of the system clock is incorrect, the data bits will be reversed in polarity and therefore the information will be inverted. This will, of course, result in errors throughout the system.

As previously suggested, waveform C in FIG. 7 is positive when waveform B does not exceed the dash line levels shown. This is the function of the level detector and can be performed by any of a variety of amplitude detection units.

Waveforms C and D (D being a clock signal from the phase select circuit 155) are combined in NOR circuit 170 of FIG. 10 to produce an output which is shown as waveform F in FIG. 7. This waveform is inverted by an inverter 172 to produce $\overline{F}$ or the false output of the NOR circuit 170. This signal is supplied to reset input of JK flip-flop 174 where, in combination with the clock of waveform D, and output shown as G is obtained. It will be noted that the F output becomes positive when, and only when, both of the inputs C and D are negative. The $\overline{F}$ output is the inverse of the F output shown and this signal tends to reset the flip-flop so that when $\overline{F}$ goes negative the output of the flip-flop is reset to go positive. The flip-flop is originally set in a negative condition by the input clock signal D. The output waveform G as may be ascertained is normally a very narrow pulse except when there is a reversal of phase of the input data and the phase is erroneous. As may be ascertained from waveform A the phase reversal occurs between time periods 6 and 7 of FIG. 7, and since the clock is of the wrong phase a wide pulse is produced in waveform G which may be supplied through an integrating circuit to the phase select circuit 155 of FIG. 6 to reverse the phase of the output as is shown at the beginning of time period 8 in waveform D. The integrating circuit would, of course, ignore the very narrow pulses at the beginning of time periods 1, 3, 5, etc. The integrating circuit is not shown since this can be easily designed and incorporated in the phase select circuit 155.

DATA DETECTOR

Figure 11:
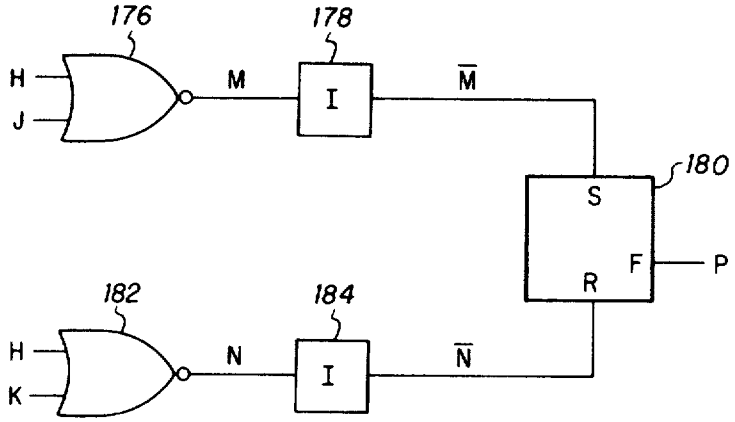
FIG. 11 is a detailed block diagram of the data detector of FIG. 6.

The explanation of the detector 163 of FIG. 6 may be clarified from an examination of waveforms H–P of FIG. 7 in conjunction with FIG. 11. For this explanation it will be assumed that the clock signal is of the correct phase and it is therefore redrawn as waveform H. Waveform J represents the time that waveform B exceeds the positive level represented by the upper dash line in waveform B. This output can be easily obtained by a low hysteresis, level detecting circuit. If two level detectors are used for detector 157 of FIG. 6, only one of these (the positive detection circuit) would supply information to data detector 163 while both of them would supply signals to ambiguity resolver 165. However, the connection lines of FIG. 6 merely show signal flows, not how many signals are flowing in a particular line.

The circuit of FIG. 11 combines the waveforms H and $\overline{J}$ (which is the false or inverted waveform J) in a NOR circuit 176 to produce waveform M which is positive whenever H and $\overline{J}$ are negative. This signal is inverted in inverter 178 and applied to a set input of a JK flip-flop 180. The K waveform in FIG. 7 is negative when the waveform B exceeds the lower limit level. Again, such a level detector may be designed on the same basis as described above. The signals shown as waveforms H and K are combined in a NOR circuit 182 to produce the waveform N which is positive whenever waveforms H and K are negative. This waveform N is inverted in inverter 184 and applied to a reset input of the flip-flop 180. An output P is illustrated which becomes positive whenever a negative $\overline{N}$ signal is applied to the reset input. This output stays in this condition upon the application of further $\overline{N}$ input pulses until it receives an $\overline{M}$ input pulse at the set input. At this time the output goes negative until receiving a further $\overline{N}$ negative-going input pulse.

Thus, it may be determined that the data detector produces an output which is supplied to the high speed buffer 114 which provides a change in output upon each change in phase of the input signal. This change of phase as previously indicated, is representative of a change of input information from an L1 to an L0 or vice versa. It will be noted that there is a ½ cycle phase delay in signal P with respect to the change in phase of waveform A. In actual practice there is more delay in signal than is shown but these delays can be compensated for by standard engineering techniques and procuedures and would only further complicate the description to have an accurate representation of such delays in this disclosure.

It will be ascertained, however, that the information on the channel data lead going to the various buffers remains in a positive or non-return to zero condition as long as there are L1 inputs and in a negative condition when there are L0 bits of input information. These positive or negative inputs may be used in conjunction with the actuation of various consecutive stages in the storage registers to store data channel bit information therein.

SYNC DETECTOR

Figure 12:
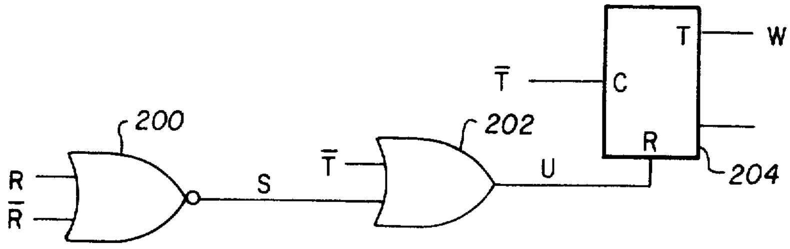
FIG. 12 is a detailed block diagram of the synchronization detector of FIG. 6.

The sync detector 167 of FIG. 6 may be further understood from an examination of FIG. 7, waveforms R–N and FIG. 12. Waveform R is basically waveform B with different dash line level detection limits. However, the two level detection limits are set differently as may be seen in time periods 3 and 4 during the occurrence of a Y1 sync pulse. Waveform S is a waveform which is positive whenever the waveform R is less than the dash line limit for a given polarity. The inputs R and $\overline{R}$ in FIG. 12 are indicative of the already level detected outputs of two level detectors in detector 161 of FIG. 6 representing the positive and negative portions. These signals are supplied to an OR gate 100 whose output is supplied to an OR gate 202. The OR gate 202 also receives an input $\overline{T}$ which is the inverse of the waveform T as shown. The output U is a signal which cecomes negative or an L0 whenever both of the inputs S and $\overline{T}$ are negative or an L0. This output is applied to the reset input of a JK flip-flop 204. Flip-flop 204 has a $\overline{T}$ signal supplied to the clock input thereof so that the output W is clocked to a positive value upon the negative-going portion of the $\overline{T}$ input and is reset to a negative value upon the application of an U input.

The incoming signal is amplitude modulated as previously indicated so that a Y1 pulse is signified by a reduction in amplitude of the incoming signal. This reduction in amplitude is shown in time periods 3 and 4 in FIG. 7. As previously indicated this occurs every 16 bits of data information. Every 4,096 bits of data information or every 256 frames the time slot indicative of 3 and 4 is not amplitude modulated and this indicates the Y2 sync pulse. In other words, the apparatus must obtain synchronization through a reduction in amplitude for the Y1 pulse and then when the apparatus is in synchronization with Y1, adjusts itself so that it realizes a Y2 pulse has occurred whenever it expects a Y1 pulse and does not receive same.

As may be determined, the W waveform is normally a series of very narrow pulses which becomes a single wide pulse of approximately one cycle in length every time a reduction in amplitude of the incoming signal occurs. Again, as explained in conjunction with waveform P, there is a delay in output with respect to the input. However, this delay is compensated for in the overall systems and is not pertinent to the invention. The long pulse can be again detected by an integrator means, which will ignore the short duration pulses, for providing the Y1 sync pulse to the out-of-sync detector.

SYNC PREDICT AND TRANSMIT SYNC CIRCUITS

Figure 14:
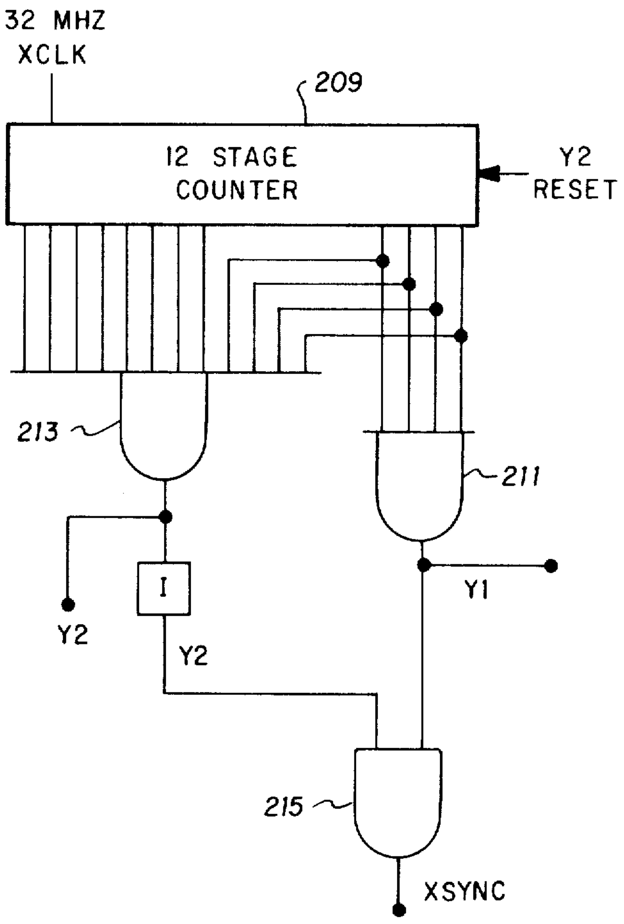
FIG. 14 is a generalized block diagram for the sync predict circuit or Xmit sync circuit of FIG. 5.

Both the sync predict and transmit sync circuits 120 and 134, respectively, of FIG. 5, may be designed in substantially the same manner. A generalized block diagram is shown in FIG. 14. In both cases a 32 MHz input signal may be supplied to a 12 stage counter 209. The four least significant bits of the counter 209 are supplied to an AND gate 211 while all of the stages are connected to a 12 bit input AND gate 213. The counter 209 also has a Y2 reset input which will set the counter to an all 1's condition. This is simply accomplished by using JK flip-flop with the Y2 reset input connected to the set or reset terminal thereof. Since the first four stages of the counter 209 represent the binary equivalent of 16, the AND gate 211 will provide an output every 16th pulse of the 32 MHz clock. This may be used as the Y1 output signal. On the other hand, all of the stages of the counter 209 will have a "1" output only once every 4,096 input pulses. Since this is the repetition of the Y2 pulse, the output of AND gate 213 can be used to provide a Y2 pulse. The Y2 pulse may be inverted and applied to an AND gate 215 along with the Y1 pulse so that $\overline{Y2}$ is normally positive and in conjunction with a Y1 pulse provides a transmit signal to the modulator 128 to decrease the amplitude of the output signal. When a Y2 pulse occurs, there will be a negative input on the $\overline{Y2}$ lead and therefore there will be no output to modulate modulator 128 at the Y2 sync pulse time.

For the transmit sync block 134, the Y2 reset input is not utilized and for use as a sync predict circuit 120, the AND circuit 215 is not utilzed.

OUT-OF-SYNC DETECTOR

Figure 15:
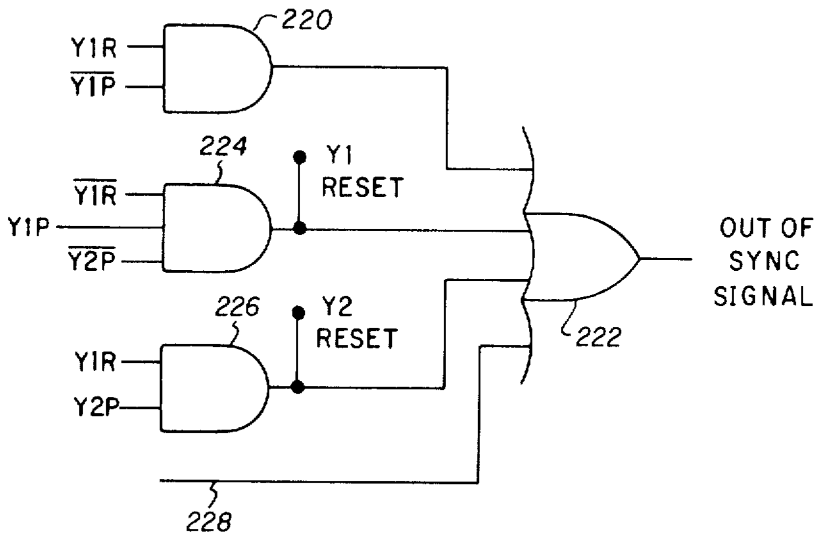
FIG. 15 is a block diagram of the out-of-sync detector portion of FIG. 5.
Figure 16:
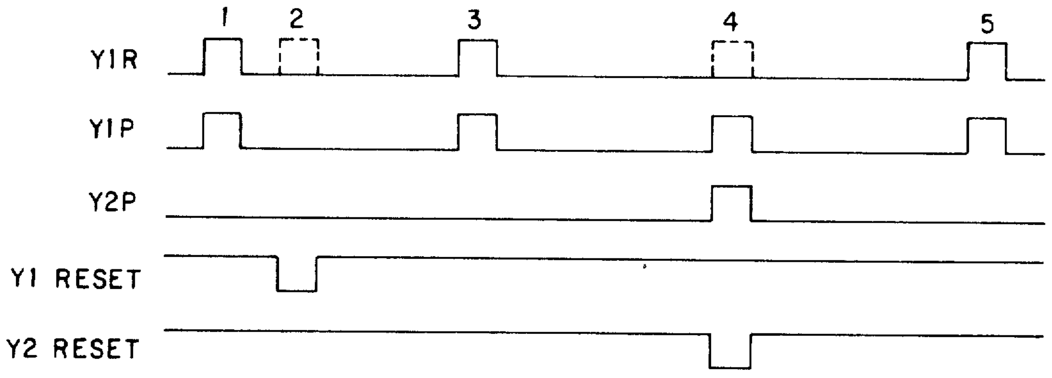
FIG. 16 is a set of waveforms for use in explaining FIG. 15.

The out-of-sync detector 116 of FIG. 5 may be better understood from an examination of FIGS. 15 and 16. In FIG. 15 a first AND gate 220 receives a Y1 receive (Y1R) input as well as a Y1 predict ($\overline{Y1P}$). These signals are shown in FIG. 16. An output of AND gate 220 is supplied to a first input of an OR gate 222 which provides an out-of-sync signal. A further AND gate 224 has a $\overline{Y1R}$ input as well as a Y1P and a Y2 predict signal ($\overline{Y2P}$). The output of this AND gate is a Y1 reset signal and is also supplied as an input to OR gate 222. A further AND gate 226 receives Y1R and Y2P input signals and provides a Y2 reset output which is also supplied to OR gate 222. A final input is provided on a lead 228 which is obtained from the ambiguity resolver to indicate an error in phase. This is not shown in the ambiguity resolver block diagram of FIG. 10 but is used primarily to allow complete resynchronization of the circuit for a period of time (approximately 30 millisends) after detection of the fact that the phase is in error. Each of the other occurrences indicating out-of-sync conditions may be used to provide this out-of-sync signal for the given period of time.

In operation the AND gate 220 will provide an output indicating receipt of a Y1 pulse when no such pulse should be obtained. This will also provide an output before the sync predict circuit 120 is operating in synchronism. However, it is primarily intended to produce an output when the system receives a Y1 pulse or other noise pulse at a time other than the predicted Y1 reception. Since Y1P is inverted to produce the $\overline{Y1P}$ input, it is always positive except when a Y1 pulse is predicted. At this time it goes negative so that the occurrence of a Y1 pulse will not produce an output. If a Y1 pulse is received at some other time an output is obtained to provide an out-of-sync signal.

The AND gate 224 receives the inverse of the Y1R and Y2P signals so that these signals are normally positive. Thus, again, no output will be obtained at any time as long as the solid line waveform for waveform Y1R is obtained. This is because at no time are there three positive inputs to AND gate 224. However, if the system is not synchronized so that a Y1 pulse is received at time 2, all three inputs will be positive and a Y1 reset output will be obtained to reset the counter to an all L1 condition thereby changing the occurrence of Y1 for later time periods.

The AND gate 226 will normally provide no output since it is to detect only the instance when a Y2 pulse occurs at time other than when it is predicted. Since it is predicted to occur at time period 4, there will be no output as long as a Y1 pulse is not received. However, if the device is synchronous as far as the Y1 pulses are concerned but not as far as the Y2 pulses, an output Y1 pulse (Y1R) will be received at time period 4 and an output will be obtained to reset the frame and frame group ring counters 124 and 122, respectively, as well as the counter of the sync predict circuit 120 so that the device will remain in synchronization as long as there are no further changes in the system. This Y2 reset pulse is shown in FIG. 16.

MODULATOR

Figure 8:
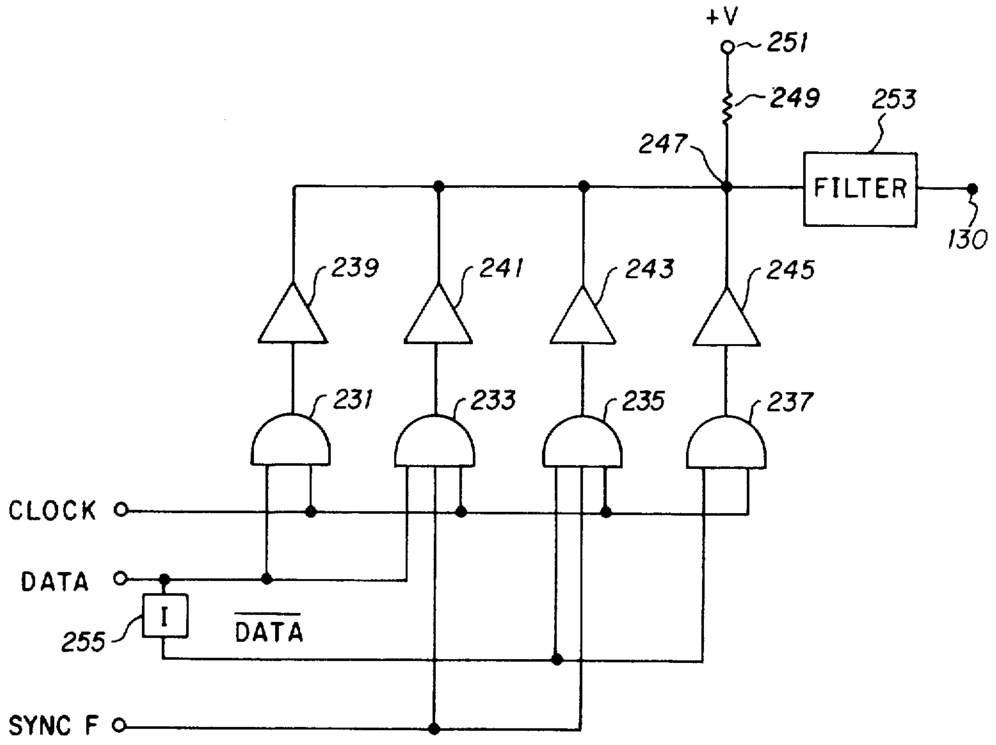
FIG. 8 is a block diagram of the modulator section of FIG. 5.
Figure 9:
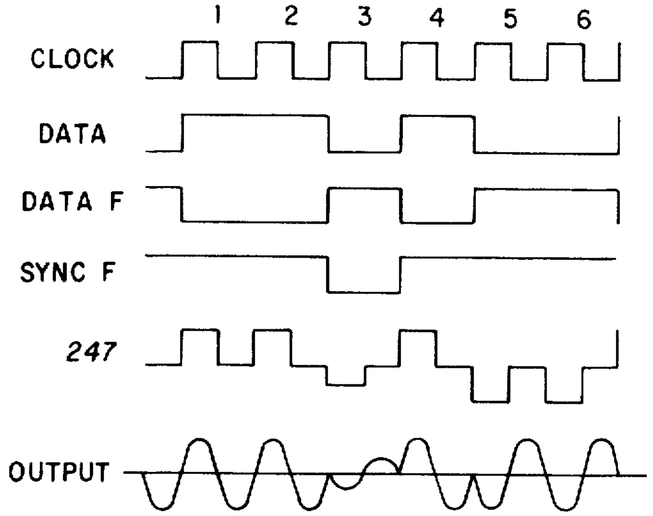
FIG. 9 is a set of waveforms for use in explaining FIG. 8.

The modulator 28 of FIG. 5 is shown in more detail in FIG. 8 and waveforms accompanying FIG. 8 are shown in FIG. 9. The clock input signals are shown supplied to each of a plurality of AND gates 231, 233, 235, and 237. The outputs of each of these AND gates are supplied to a plurality of amplifying means or buffering stages 239, 241, 243, and 245, respectively. The outputs of each of these amplifying means are summed together at a junction point 247 which is connected through a resistor 249 to a positive potential 251. The resistor 249 in conjunction with each of the amplifiers 239–245 is used for the purposes of summing to provide a combined signal to a filter 253 which has an output 130 as shown in FIG. 5. Such a filter is designed to have an impulse response of ½ cycle of a cosine wave which impulse response characteristic will produce 1 cycle of sine wave out with a ½ cycle rectangular input signal. Incoming data is supplied to AND gates 231 and 233 while the data is inverted by inverter 255 to supply data false signals to AND gates 235 and 237. The signal indicative of sync false is supplied as a third input only to AND gates 233 and 235. The sync false signal would be the false version of the X or transmit sync signal shown as an input to modulator 128 in FIG. 5. In operation the data is shown in FIG. 9 in much the same fashion as shown in waveform P of FIG. 7. In other words, the AND gate 231 may be allowed to pass signals for more than one incoming clock pulse in succession. As shown, both AND gates 231 and 233 are turned to an ON condition for time periods 1 and 2 and thus their outputs are combined. However, for time period 3, the sync false signal prevents either AND gate 233 or 235 from operating so that an output is obtained only from AND gate 237. This is illustrated by a reduced amplitude output for waveform 247. The rest of the time periods are believed to be self-explanatory.

These signals are supplied to filter 153. This filter is described in more detail in a patent to John D. Hill, U.S. Pat. No. 3,614,674, titled "Filter Apparatus" and assigned to the same assignee as the present invention. This filter takes a ternary-level pulsating square wave return to a 0 signal and converts this to a sine wave biphase amplitude modulated signal in accordance with the amplitude modulation of the waveform 247. The output 130 is as shown in the lower waveform of FIG. 9. It will be realized that the Y1 sync pulses result in approximately one-half to three-quarters amplitude output pulses whereas the Y2 sync pulses prevent the occurrence of a Y1 pulse and therefore full amplitude output signals are obtained during this bit of transmitted data.

HIGH SPEED BUFFER

Figure 13:
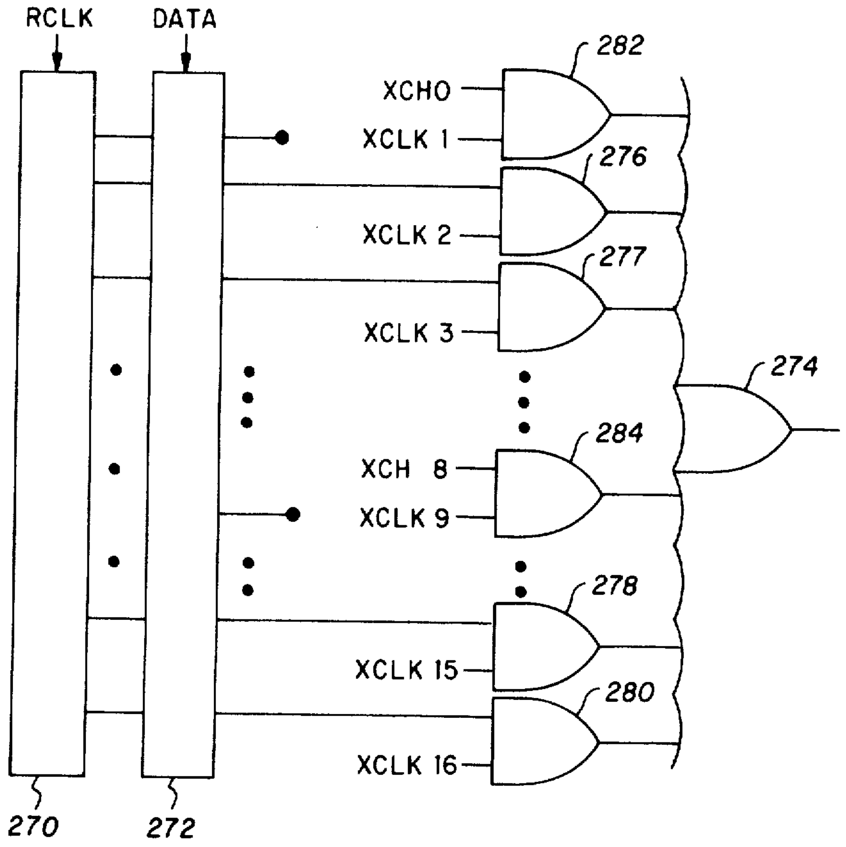
FIG. 13 is a block diagram showing somewhat more detail for one of the buffer portions of FIG. 5.

The high speed buffer 114 is illustrated in somewhat more detail in FIG. 13 in conjunction with a receive channel counter. In FIG. 13 a counting mechanism, receive counter, or ring counter 270 is shown receiving a clock signal. This receive counter may be that of 126 in FIG. 5. Each of the outputs of the various stages of counter 270 are supplied to a storage register 272. As data is supplied to an input terminal of register 272 it is stored in consecutive stages of register 272 in accordance with clock pulses or counter pulses received from ring counter 270. The operation of counter 270 may be substantially in accordance with that described in the ring counter described and referenced supra. It will be noticed, however, that not every stage of the storage register 272 is connected through an AND gate to a 16 input OR gate 274 at the right hand side of FIG. 13. Rather, as shown, channels 1, 2, 14, and 15 are shown connected to the register 272. As described, other stages 3, 5, 6, 7, 9, 10, 11, and 13 would also be connected to the appropriate stages of register 272. However, these have not been shown for purposes of simplicity. As shown, however, stage 2 (data bit channel 1) of the register 272 is connected to AND gate 276 while stage 3 (data bit channel 2) is connected to AND gate 277. Stage 15 (data bit channel 14) is connected to AND gate 278 and stage 16 (data bit channel 15) is connected to AND gate 280. Two further AND gates 282 and 284 are also shown. AND gate 282 receives an input labeled XCH0 which standard for transmit (data bit) channel "0" while AND gate 284 receives an input XCH8. From the previous description it will be realized that the channel 0 input is obtained from low speed buffer 118 while channel 8 is connected to medium speed buffer 116. In addition, although not shown, channels 4 and 12 are received from medium speed buffer 116. Each of the AND gates 276–284 also has a clock input which is connected to the appropriate transmit ring counter.

In operation, channel "0" receives its clock pulses from clock "1" whereas channel "1" receives its clock pulses from clock "2." This continues through the final stage utilizing AND gate 280 wherein channel 15 is clocked by clock pulse 16.

As previously indicated, the buffer stage 272 stores data from each of the channels. However, in the connection of the embodiment shown, the data from channel "0" in register 272 is not utilized but rather is delayed by low speed buffer 118 and is presented on the XCH0 input of AND gate 282 so that it is presented to the output when the clock "1" pulse is received. The clock 2 pulse retrieves the information from stage 2 (channel 1) and so forth.

SUMMARY OF LOOP SYNCHRONIZER OPERATION

From the above description it should be realized that the incoming data is combined in a multiplex operation comprising, in this embodiment, 16 channels. Adjacent channels such as 0 and 1 may operate at different bit rates. Thus, while the data in channel 0 occurs every 16 bits, it may be only utilized by connected apparatus once every 256 frames. In this way, apparatus which is connected to demodulate information from channel 0 (on the part of the data loop not shown) can comprise 256 different devices each obtaining one data bit of information once each frame group. The medium speed buffer on the other hand also receives data bits each time a channel 4, 8, or 12 time slot occurs. However, in this mode of operation the connected peripheral equipment each receives one data bit of information each frame subgroup or in other words once each 16 frames. The devices connected to the remaining channels are high speed units and require their information at least once every 16 data bits. Thus, as previously explained the high speed buffer must delay its information so that the loop delay is an integral number times the repetition period of 16 data bits whereas the medium speed buffer must delay the information as transmitted so that the loop delay to the output is an integral number times 16 frames or 256 bits while the low speed buffer 18 delays its information so that the loop delay is 256 frames or 4,096 bits.

The incoming data is accordingly stored in appropriate buffers which delay the information until it is actuated by the appropriate read out strobe signal to be supplied to output lead 30.

There is of course the possibility that data being supplied at terminal 110 is in synchronism with that being transmitted on terminal 130. Assuming no delays in the loop synchronizer, there is a possibility of conflict in reading in and reading out simultaneously from the registers within the buffers.

Although the solution to this possible problem is not shown it can be corrected simply by comparing the time occurrence of the read in and read out clocks for one of the channels such as channel 15 and inserting a 3 bit delay or removing the 3 bit delay through the use of a latching relay whenever a read in and read out occur at substantially the same time. This, of course, will produce an out-of-sync condition momentarily but the system will immediately supply reset pulses Y1 and Y2 to the appropriate blocks to resynchronize the receiving portion. This, of course, will have no effect on the output signal represented in the right-hand portion of FIG. 1 other than to prevent the occurrence of false output information due to interaction between the read in and read out pulses.

DESCRIPTION OF LOOP COUPLER 16 OF FIG. 1

Signals are received from the L1 loop or main data stream via lead 310 in demodulator 312. An output of demodulator 312 on lead 314 is an unfiltered clock signal which is supplied to a phase lock loop 316 to remove jitter. An output 318 of phase lock loop 316 is a filtered clock signal which is supplied to most of the rest of the blocks in the circuit. However, this clock signal is only shown applied to blocks in which the clock signal is discussed in an attempt to keep the drawing simple and make it easier to understand. A received data (Data R) output from demodulator 312 appears on line 320 and is supplied to a channel data exchange block 322 and to a time division address counter and multiplexing circuit 324. Received sync pulses (YR) are supplied on a lead 326 to a sync and error detection circuit 328. The sync circuit 328 receives Y1 and Y2 predict pulses and transmits Y1 and Y2 reset pulses from and to the TDA counter 324 in a manner similar to that described in the loop synchronizing application referenced above. The sync circuit 328 also has a Y1 transmit output signal on lead 330 which is supplied to a modulating meand 332. An output of modulating means 332 is connected to the L1 loop and is designated as 334. Naturally, the modulator as well as many other blocks receive a clock signal as mentioned above but such is not shown since it is not specifically essential to the inventive concept being described and claimed. The sync outputs of the TDA counter 324 are also supplied to various other blocks such as channel data exchange 322. Again, such connections will not be shown for the purpose of simplicity. Data to be transmitted on L1 (D1T) from the multiplexing unit 324 is supplied on lead 336 to modulator 332. The channel data exchange block 322 supplies exchange data XD and exchange timing X signals on leads 338 and 340, respectively, to the multiplexing circuit 324. An orderwire two data exchange block 342 supplies similar data and timing signals to the multiplexing circuit 324 on leads 344 and 346. As shown the exchange unit 342 receives data and synchronizing signals Data R and Y1P. A comparison circuit 348 receives a plurality of leads from the counter and multiplexing unit 324 and supplies timing signals (X) to the data exchange unit 322 and 342 as well as to a further multiplexing means 350. The multiplexing means 350 also receives loop 1 data (RD) from the exchange means 322 as well as from the data exchange unit 342 which detects orderwire data [RD(OW)].

As may be determined thus far, the described apparatus operates much the same as that described in the above-referenced terminal unit application except that two data paths are provided. Most of the data received on line 310 continues on line 320 through the multiplexing circuit 324 and out lead 336 to the modulator 332 and back to the loop on lead 334. However, every predetermined time period, such as the channel 4 time period, data is stored in exchange unit 322 and an output is supplied on lead 337 to the multiplex means 350. If, during the predetermined time period, no exchange is to take place, which occurs only during OW-2 period, the data on lead 338 is ignored. However, if there is an exchange to take place, the data on lead 338 (which comprise timing pulses representing the data on lead 386) will be inserted in the data on lead 320 to produce D1T on lead 336.

Timing signals from comparator 348 are applied via lead 352 to the data exchange 322, the multiplex circuit 350 and the data exchange 342. The signals applied to exchange blocks 322 and 342 are utilized for the purpose of sampling the signals at the proper (but different) times and are used in multiplexing circuit 350 for switching multiplex 350 from receiving the data from exchange 322, as it normally would, to receiving data from exchange 342 for one frame per each frame group. The clock input appearing on lead 318 to multiplex 350 provides the signal to retrieve the data from the storage sections in the exchange units 322 and 342. During this channel 4 time period, data on lead 320 is blocked from direct application to the multiplex unit 324 which instead retrieves data from lead 338 and supplies it to lead 336 to be placed in the data stream of the main loop.

As referenced above, in the embodiment being described, the orderwire two data appears only on channel 0 and only once during each frame group. Thus, at each predetermined time interval of channel 0 operation, the multiplex unit 324 refuses to receive data on lead 320 and instead receives data on lead 344.

The comparator 348 is constructed on the same basis as the similar comparators of the terminal units 14 of FIG. 1. The data exchange blocks basically comprise the sample and store, and wave shaping unit of the above-referenced terminal units.

After the two data streams are received by multiplexing unit 350, they are multiplexed together and supplied on output lead 354 with the aid of the timing pulses received from 348, 322, and 342 to a loop 2 modulator 356. The modulator 356 must also receive clock signals on a lead 358 and synchronizing signals on a lead 360 from the exchange 322 and the multiplex unit 350, respectively, through a multiplex unit 362. Also shown is a multiplexing means 362 supplying inputs on lead 360 to modulator 356. Multiplexing unit 362 receives error input signals from both the error detector 328 and from a loop 2 counter and error detector 364. An output from modulator 356 is supplied through a plurality of terminal units 366 back to an input of a loop 2 demodulator 368. The first terminal unit 366 is shown connected to a line printer 378 while the second terminal unit is connected to a cathode ray tube. The final disclosed terminal unit 366 is shown connected to a card punch 380. Demodulator 368 has various outputs providing loop 2 clock, sync, and data signals to a phasing circuit 382. Phasing unit 382 supplies data through a variable delay buffer 384 to the two data exchange blocks 322 and 342 on a lead 386. The phasing block 382 receives loop 1 clock and Y1 predict input pulses for the purpose of frame control timing, respectively, of the input data signals. The phasing block 382 also has loop 2 derived sync and clock output signals supplied to the L2 counter and error detector 364 which supplies a plurality of outputs 387 to a variable delay control 388. Control 388 supplies further signals 390 to buffer 384.

The error detection portion of block 364 provides error signals both to the block 328 and to the multiplexing unit 362. As previously indicated an output of error detector 328 is also supplied as an input to block 362. Although block 362 is only shown as having one input, these two inputs are OR'd inside unit 328 and presented to the appropriate circuitry in multiplex 362. If either error detector detects a lack of synchronization, an output is provided so that extra sync pulses are provided to leads 360 and 330. This produces amplitude modulation of the data bits being supplied to loops L1 and L2 and thus puts all of the units in the system on notice that there is a lack of synchronization. Each of the terminal units in the system is prevented from operating for a predetermined time after removal of the extra sync pulses to assure that the entire system is once again in synchronization. In actual practice and under normal operation the extra sync pulses need be inserted only when the system is modified by the addition of extra terminal units or upon start up of the system operation.

The data returning from loop 2 is bi-phase and amplitude modulated in much the same fashion as described in the above-referenced applications. However, the data on loop 2 is square wave rather than sine wave as in loop 1. Thus, the timing of this data can be corrected by utilizing the clock signals appearing on lead 318 to phasing network 382 to match the data signals to the timing of the loop coupler for eventual transmission into the respective data exchange block 322 or 342. The Y1 predict pulses are used to correct the data to the proper frame timing. The counter 64 provides a frame count using the sync pulses received from the loop 2 signals as the reference. Upon occurrence of the Y2 predict pulse in the storage means 388, the count in counter 364 is sampled and stored. The stored count in control means 388 is then utilized to set the delay in a delay matrix comprised of a plurality of serially connected delay units so that data received from the loop is delayed the right amount of time to be inserted into loop 1 in the proper frame (channel 0 or channel 4 in the embodiment described). Basically, the blocks 364, 382, 384, and 388 cooperate to make the total frame delay of the signals passing through loop 2 and buffer 384 equal to an integral number of frame groups for resynchronization purposes.

The loop coupler provides four bits of delay for the data which is being supplied on channels other than that being used by the loop coupler. In the cited example, the data of channels 0–3 and 5–15 experience only four bits of delay. The remaining bits on channel 4 and the periodic bit for orderwire two experience a delay which may theoretically be any integral number of frame group time periods.

The data which is supplied to the auxiliary loop experiences approximately one frame delay between the time it enters demodulator 312 and the time that it is supplied from the output of modulating unit 356. If the rest of the delays in loop 2 are slightly more than one frame group period, the above-referenced frame group synchronizing means will provide enough delay in block 384 to produce a full two frame group time period delay between subtraction of data from the loop 1 and the resubmission of substantially the same data or substitute data back onto loop 1 via modulator 332.

While some of the leads from one block to another have been shown as cables, some of the other single line leads actually provide a plurality of signals. Therefore, the showing of a single lead is not to be considered to be restrictive.

As indicated supra, the purpose of the phasing circuit 382 is to provide frame timing. In FIG. 18 more detail is shown as to the contents ob block 382 of FIG. 17. Since all the rest of the blocks have been disclosed in the referenced applications and patents or are easily found in the prior art, this is the only block which is being described in greater detail.

As will be noted, an input 400 labeled D2R supplies data signals to a shift register 402. Shift register 402 in effect provides a one-half bit period delay of the auxiliary loop bit. Thus, it would be delaying the signal for a time period equivalent to 8 bits or one-half frame of the main loop. A second input 404 labeled C2R provides auxiliary loop clock signals to a shaping circuit 406 for squaring the signals. The output of shaping circuit 406 provides a second input to shift register 402, provides a first input to an AND gate 408 and an input to a second AND gate 410. Outputs of the two AND gates 408 and 410 provide set and reset inputs to a flip-flop 412. The input 400 is also applied to an AND gate 414 which receives a second input on a lead 416 from flip-flop 412. An output of shift register 402 provides one input to an AND gate 418 which receives another input on a lead 420 from flip-flop 412. The outputs of the two AND gates 414 and 418 are supplied through an OR gate 422 to an input of a flip-flop 424 which supplies data on an output lead 426.

Figure 17:
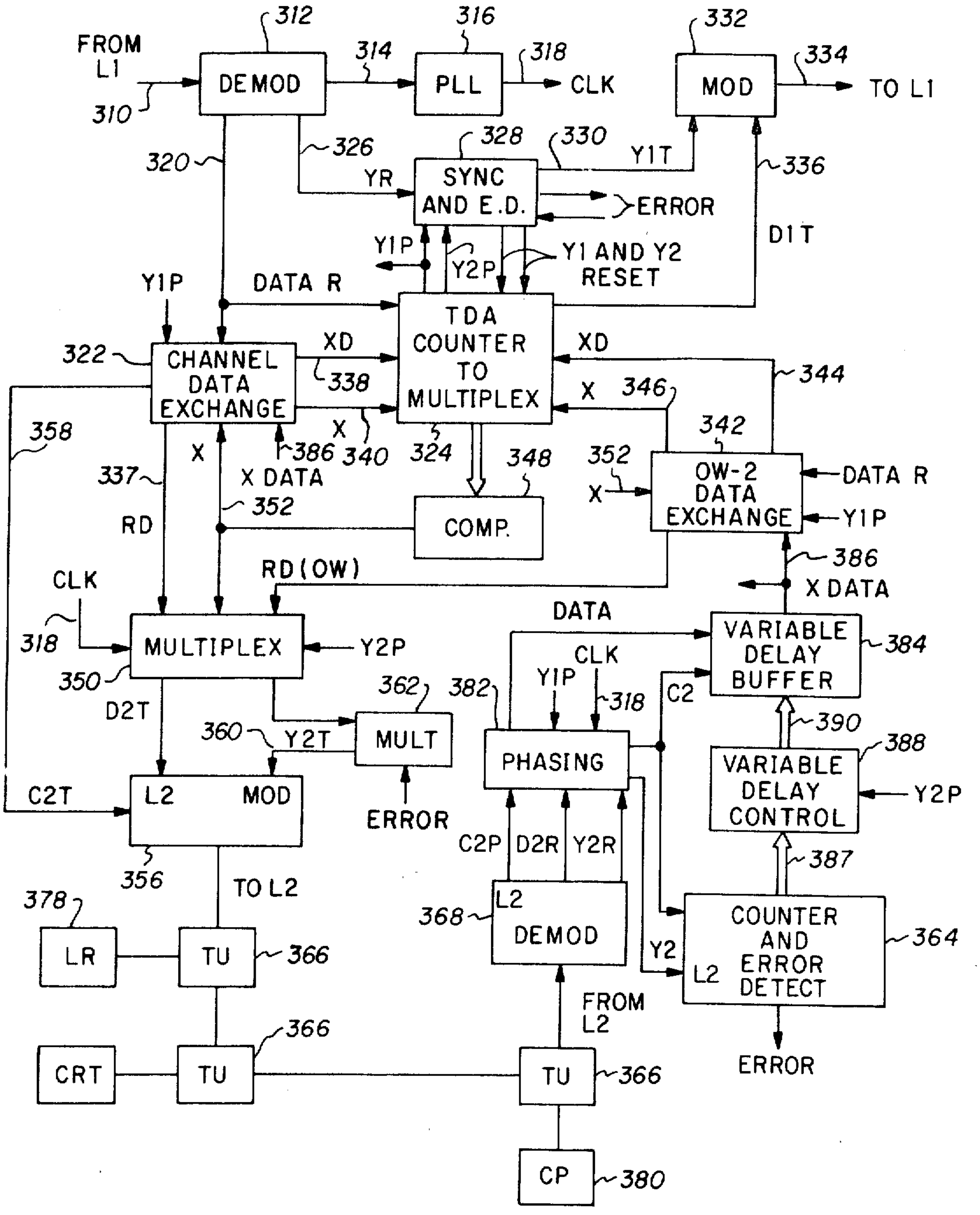
FIG. 17 is a block schematic diagram of the coupling apparatus including an auxiliary loop but without details as to the rest of the main loop.
Figure 18:
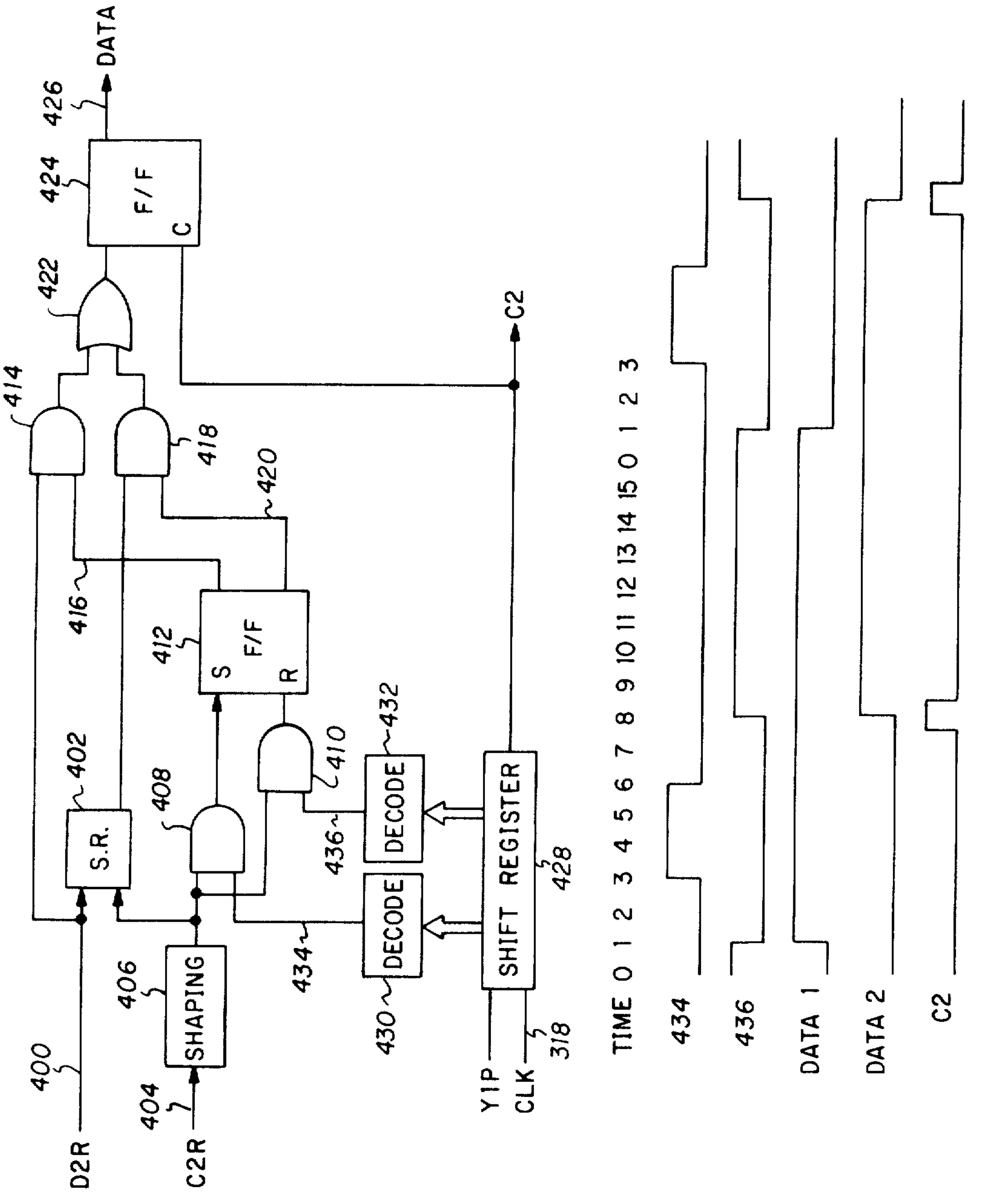
FIG. 18 is a detailed block diagram of a portion of FIG. 17.
Figure 19:
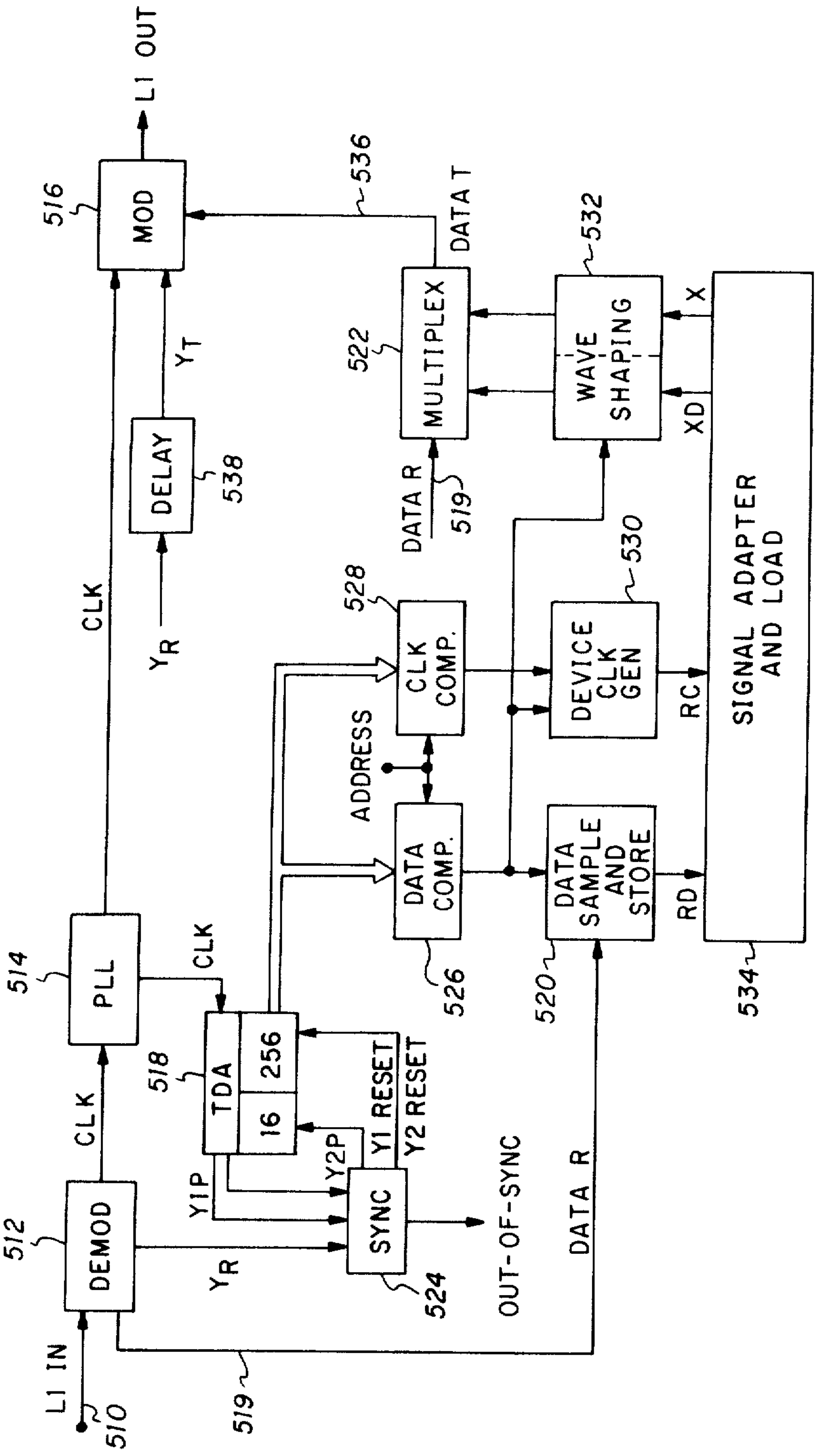
FIG. 19 is a block diagram schematic of one embodiment of a terminal unit 14 as shown in FIG. 1.

The inputs and outputs of the circuit of FIG. 18 are provided with the same designation as shown in FIG. 17. Accordingly, a shift register 428 receives Y1 predict (Y1P) and clock signals at the input and provides a C2 clock output. This C2 clock output is also provided as a clock input on the flip-flop 424. In addition, shift register 428 provides a plurality of signals to first and second decoding circuits 430 and 432. The two decoding circuits may comprise a plurality of AND gates so that they are in an ON condition for a predetermined amount of time in accordance with the count of the shift register. An output on lead 434 of decode circuit 430 is provided to AND gate 408. An output 436 of decode 432 is provided as a second input to AND gate 410. The timing diagrams of FIG. 18 show waveforms 434 and 436 indicative, respectively, of the signals appearing on the output leads of the decode circuits. In accordance with standard notation, the AND circuits provide an output with two positive inputs. Thus, AND circuit 408 will provide an output when a clock appears during the interval between time periods 3 and 6 while AND gate 410 will provide an output to reset flip-flop 412 when a clock signal from shaping circuit 406 is received between time periods 8 and 1. The time between adjacent time interval notations equals one bit period on the main loop. Thus, the interval from time 1 to time 1 is equivalent to one bit period on loop 18. The purpose of the circuit is to prevent C2 from occurring at a time when the polarity of the data signal is indeterminate. Two data waveforms are shown as Data 1 and Data 2 and are to be considered in the alternative and not in the combination. In other words, the circuit is designed to leave the timing as is if the clock signal C2 appears in approximately the position shown with respect to data which has the waveform as approximately shown as Data 1. However, if the clock signal C2 should occur during the time that the data may change in polarity as shown with respect to Data 2, the flip-flop 412 will be set or reset as the case may be so that the data will be altered from passing through one of the AND gates 418 and 414 and transferred to the other. As indicated above, the shift register 402 has a delay equivalent to one-half of an L2 bit period and thus with the condition shown as Data 2 and C2, the change would place the clock and data signals as shown in the two waveforms C2 and Data 1.

It should be noted that, in the following description of operation, there is no timing relationship intended between the pair of waveforms 434 and 436 and the remaining waveforms.

In operation, if the clock signal C2R, which occurs during the middle of the data signal appearing on 400, occurs during time periods 1–3 and 6–8, there will be no positive signals at the alternate leads of either AND gates 408 and 410 and nothing will change in the circuit. During these times the data appearing on 400 can be applied either directly to the output 426 or delayed one-half bit by shift register 402 and there will still be no ambiguity in operation of the rest of the circuitry due to the time of occurrence of clock pulse C2 and the data appearing on lead 426. However, if the clock pulse C2R occurs during time period 3–6 the AND gate 408 will provide an output to set flip-flop 412, if it is not already set, so that AND gate 414 will provide an input and the data will not be delayed. On the other hand, if the clock input C2R occurs during time periods 8–1, the flip-flop 412 will be reset so that the data incoming signals will be provided through the shift register 402 and delayed one-half bit before being applied to the output 426.

The phasing block 382 in FIG. 17 shows a second input Y2R and a second output Y2. The phasing circuit 382 actually contains two circuits as shown in FIG. 18 operating simultaneously, one for removing possible ambiguity from the data signals and the other for removing possible ambiguity from the synchronization signals.

In summary, data is retrieved from a main communications loop 12 of FIG. 1 via demodulator 312 and supplied through a multiplexing unit 324 to a modulator 332 a majority of the time. This data is merely delayed in the multiplexing unit a short amount of time, in the order of two data bit time periods, before retransmission into the main loop. Periodically, data is stored and new data is exchanged therefor in the exchange blocks 22 and 42. The data to be exchanged is supplied to multiplexing unit 24 and it is there substituted in the time slot, such as the channel 4 time slot, to be inserted in the main loop. The stored data is then periodically sampled at a rate equivalent to the frame rate and supplied to a further multiplex 350. This multiplex unit 350 combines the data from channel 4 and the orderwire data from channel 0 into a serial bit multiplex configuration. This multiplexed data is supplied on the auxiliary loop 2 to the various devices contained thereon. The data bits appearing on loop 22 are much longer in duration than the data bits on loop 12. In the embodiment disclosed, the data bits on loop 22 have a time period equal to one frame of the data in loop 12. The loop 22 data bits, even though individually the length of the loop 12 frame, are still interlaced with other data bits so that it may take several frame groups before enough data bits are received to form a word. The terminal units on loop 22 count the time from the synchronizing pulse until their time division address at least once each frame group period if the device is operational. At times data will be exchanged for the removed data and this information continues around the loop and through the other terminal units, which may be removing data for their devices from different time periods in the frame group, until the data is returned to demodulator 368. The data is then resynchronized to the timing of the main loop by delaying it so that the total delay is an integral number of frame groups, somewhat in the same manner as described in the above-referenced loop synchronizing apparatus before being supplied to the data exchange blocks 332 and 342 for exchange with further data in the appropriate time period.

If a single loop coupler is utilized with a main communication loop, there will be, as disclosed in FIG. 1, 15 short loops and one long loop which includes (short and long referencing to time rather than physical dimensions) the terminal units connected to the auxiliary loop. The system may be designed so that more than one loop coupler is connected to other channels such as channel 8 and 12 to retrieve data for other auxiliary loops. As will be realized by those skilled in the art, terminal units such as 366, which need only demodulate at a low speed such as 2 MHz, are much easier and less expensive to design than terminal units which must operate at the main loop rate of 32 MHz. Therefore, the loop coupler concept not only minimizes message transmission times for a majority of the channels but greatly reduces the cost of connecting low speed peripheral equipment to the communication link.

This concept thereby enables a system to communicate with a large number of low speed devices, wherein a large amount of time delay is not particularly important, while still communicating with higher speed devices on the remaining channels where the large amount of time delay to communicate with all the devices on the auxiliary loop would become intolerable.

TERMINAL UNIT OF FIG. 19

As shown, a terminal labeled 510 and titled L1in supplies a serial data bit stream to a demodulator 512 which supplies an output clock signal to a phase lock loop 514. The phase lock loop 14 is effectively a filter to remove jitter from the incoming signal. The incoming signal, as indicated in the above-referenced copending application, is a biphase sine wave which is amplitude modulated for synchronizing signals and is phase modulated for data logic signals. The phase lock loop supplies a clock output signal to all blocks. However, to preserve clarity of drawing, only the connections to an apparatus modulator 516 and to a time division address (TDA) block 518 are shown. The modulator 516 is also designed according to the techniques described in the above referenced application. The output of modulator 516 is labeled L1out and supplies an output signal similar to that supplied to input 510. This signal may, however, have different data bits multiplexed therein because of information received from the load. An output 519 of demodulator 512, which is labeled Data R or Data Receive, is supplied to a data sample and store block 520. This signal is also supplied to a multiplex, interlacing, or interleaving circuit 522. A further output from demodulator 512 is a $Y_R$ or Y Receive signal which is supplied to a sync circuit 524. The TDA block 18 supplies Y1P and Y2P signals to sync 524. These two signals are the predict signals and are obtained in much the same manner as described in the above-referenced application. The TDA unit is basically a pair of counters, one of which will count to 16 and the other of which will count to 256. The first counter is activated by the clock input and the second counter may be activated by the output of the first counter to produce a 4096 state counter. The count to 16 counter supplies the Y1 predict pulse while the combination of the 16 and the 256 count unit supplies the Y2 predict pulse. Two outputs from the sync circuit are shown as Y1 reset and Y2 reset. The Y1 reset will, of course, reset the 16 counter to 0 when a Y1 pulse is received while the second counter is reset to 0 when a Y2 signal is received, if and only if, the predict signals do not agree with the received signal. A further output from sync circuit 524 is an out-of-sync signal indicating that the system is in error or has been in error within a prescribed period of time previously. The TDA unit 518 supplies a plurality of outputs (shown as a cable) to a pair of matrixes 526 and 528 labeled data comparison and clock comparison, respectively. Both of these blocks 526 and 528 receive inputs from an address. This address may be changed manually or by various means such as a control program. Basically, each of the comparison circuits compares the output obtained from the two counters with TDA 518 against the address and supplies an output when the two signals are identical or in some other predetermined set of conditions. As shown, comparator 526 supplies an input to the data sample block 520. This input is also supplied to a device clock generator 530 and to a wave-shaping circuit 532. The device clock generator 530 also receives an input from comparison circuit 528. An output labeled RD or Received Data is supplied from data sample store 520 to a signal adapter and load 534. Adapter 534 also receives a clock signal labeled RC from block 530. The reason for using the complicated apparatus to supply a clock to the adapter is so that it is at the proper frequency and phase with respect to the rate that the data bits are being removed from the serial bit stream. In other words, the bit extraction circuitry may be designed so that the bits can be removed, in one embodiment of the invention, every 16 bits or at other multiples or submultiples of 16 bits apart. In some instances the apparatus may be designed to remove data bits oftener than every 16 bits. Since the rate of data receipt can be altered by merely changing the input address, the clock must be changed coincidentally rather than merely taking the system clock from the phase lock loop 514. The load, which may be a disc file, a processor, or other communication or peripheral type device at appropriate times, through the adapter circuitry, will supply bits to the data stream to be multiplexed therein. These bit signals appear on the outputs XD and X as exchange data and exchange timing signal. The signals XD and X are non-return to zero and are changed in wave-shaping device 532 to return to zero signals as discussed in the modulator section of the above-referenced application. The timing for the wave-shaping unit is obtained from the data compare block 26 for the purposes of this explanation. However, in actual practice there are certain timing problems which must be overcome so that data is supplied to the multiplex unit 522 from block 532 at substantially the same time that data is removed from the serial bit stream and supplied to the load. In actual practice this is accomplished by designing the matrixes within blocks 526 and 528 so that a comparision is obtained slightly before the data bit is supplied on the data receive line. Thus, there is an output to the blocks 520 and 530 to receive the data from the data receive line at the proper time. The same timing problems exist with respect to the wave-shaping circuit 532. Since the data must be supplied to multiplex 522 at the proper time, the signals must be obtained from the load 534 prior to the time that they are to be inserted and multiplexed. The multiplex unit 522 has a one bit delay before being supplied on lead 536, which is labeled data transmit, to the modulator 516. To compensate for this one bit delay in multiplex 522, the sync pulses which are labeled Y Receive are delayed one bit period in a delay circuit 538 before being supplied to modulator 516. The output of modulator 516 is part of the communication line or loop depending upon the utilization of the data bit stream.

In a review of the circuit it will be realized that a bit multiplexed data bit stream is supplied on load 510 and demodulated in demodulator 512 to remove the data, the sync signals and the clock. The data signals are then supplied through multiplexer 522 to the modulator 516 and on to further communication devices. At periodic intervals, in accordance with the address supplied to the comparison networks 526 and 528, a data bit is removed from the bit stream stored in block 520. The adapter 534 examines these bits and upon reception of the proper words, supplies data to the load. At other times, although it may be simultaneous with reception of data, data bits are supplied to the multiplexer 522 to be exchanged for bits that were on the line at the times so indicated by the address.

Thus, the present device, suitably modified for different loads, may be utilized to extract data bits from a bit multiplexed serial data bit stream and exchange other bits therefor, whereby a plurality of such units may be connected to the line and to loads such as computers, storage units, and other utilization devices such as card punches, printers, and CRT's. While the implication of usage has been primarily for computer-type systems, the invention may be utilized with any digital communication system such as telephone and telegraph.

As will be realized, some loads such as computers may require data from more than one source. This can be easily accomplished by duplicating blocks 520, 522, 526, 528, and 532, connected substantially as shown in the drawing for a further parallel channel. It will be further realized by those skilled in the art that the signal adapter will examine the received word to determine whether or not its address is appropriate for the particular load involved and to determine the type of word being received. In one embodiment of the present invention the signal adapter includes a device for counting the number of consecutive zeros. Since the embodiment is designed to provide a 1 with 35 zeros following for an initial word, the adapter may synchronize itself with the incoming data by waiting until 35 zeros are counted before becoming operational. It is then apparent that the next logic 1 which is received must, by apparatus design, be the start of a new word. The exchange data is also propagated by the adapter upon determination of various conditions such as the load finishing its presently assigned work or in the case of a memory, the load being instructed to supply certain data onto the data bit stream.

Thus, the processors in FIG. 1, utilizing the concept outlined in U.S. Pat. No. 3,662,401 act to solve problems and communicate with each other as indicated supra and in U.S. Pat. No. 3,659,271 for solving the problems on an orderly basis while transmitting information to and receiving it from the various connected devices.

As shown, an entire system may be connected to another system for obtaining information or transmitting it thereto via a communication link 44. This type of communication would be where one system was many miles from another system. For shorter runs the single loop 12 would provide much faster communication since the communication links presently available for link 44 do not offer anywhere near the speed capacity of loop 12. As indicated above, one embodiment of the invention provided data rates of 32 megabits per second for loop 12 with each time slot or channel recurring at the rate of 2 megabits per second. Other embodiments may operate at much higher speeds for either the loop or channel rate or both.

The present system has a further feature in providing an error detector such as 38 and 40 to each of the processors for recording errors occurring during arithmetic computations and errors in the hardware per se. While each of the error detectors could be connected to one processor 32, a processor normally cannot monitor its own errors. In some instances, the errors will shut down the processor. Therefore, as disclosed, processors 34 and 36 report their errors to processor 32 via the TDM loop connected thereto while the errors of processor 32 are reported to processor 34. This provides complete separation of error detection techniques while still providing relatively centralized information as to system errors.

In summary, therefore, the present invention overcomes some of the difficulties of the prior art by utilizing a single connecting cable between a plurality of series connected units whereby data is transmitted therearound on a time division multiplex basis so that the various processors and associated devices may exchange data on whatever channel may be free at the time to eliminate the problem of waiting for a particular channel to be free. The ability to utilize a loop as shown is enhanced by the loop synchronizer 10 and the system is able to utilize low speed units without sacrificing speed on the main loop via the loop coupler 12 and its associated auxiliary loop. As will be realized, although loop 22 was shown connected to channel 0, it could easily be connected to any of the other channels. Further, more than one loop coupler and associated auxiliary loop could be connected to the main loop 12.

While a specific embodiment has been shown and described, it is my belief that the invention encompasses the broader concept of communicating between various devices via a continuously circulating stream of data divided into a plurality of data channels as described in the appended claims.

I claim:

1. Communication apparatus for use with data in a serial multiplexed time slot format comprising, in combination:

processor means;

a plurality of terminal unit and associated devices means wherein at least one of said devices has a different data handling capability from others of said plurality of devices and each terminal unit means being adapted for processing data at a rate commensurate with its associated device;

synchronizing means; and means connecting said processor means, said terminal unit means and said synchronizing means in a closed communication loop for continuous circulation of data therearound;

the data in some of the different multiplex time slots having different periodicities from data in other time slots, at least one terminal unit means retrieving data at a different periodicity than another terminal unit means, and said synchronizing means comprising a variable delay means for each data rate occurring on the loop for use with data successively occurring at different periodic rates.

2. Apparatus as claimed in claim 1 wherein said plurality of devices includes at least one data storage device means external to said processor means.

3. Apparatus as claimed in claim 1 comprising in addition:

loop coupling means connected to said closed communication loop, said loop coupling means comprising a plurality of load means and associated terminal unit means; means connecting said associated terminal unit means of each of said load means as a part of said closed communication loop through said loop coupling means for transmission therethrough of said data in a time slot channel in a serial multiplexed format.

4. Apparatus as claimed in claim 1 wherein said processor includes a plurality of serially connected devices connected thereto and forming a time division multiplex loop.

5. Apparatus as claimed in claim 1 wherein said processor means comprises a plurality of processor units at least one of which is connected to a plurality of serially connected devices forming a time division multiplex loop separate from said closed communication loop and wherein said plurality of serially connected devices of said time division multiplex loop includes processor error detection means connected to the remaining processor units for providing an indication to said one processor unit of improper operation of said remaining processor units.

6. A communication system incorporating a plurality of devices at least two of which have different data handling rates and comprising, in combination:

a plurality of devices each of which may extract data on a predetermined periodically successively occurring basis from channel divided serial multiplexed data passing therethrough and each of which devices may supply exchange data, at a recurring data time period associated with that device, to be inserted in substitution for the data extracted the predetermined periodically successively occurring for at least one device being different from remaining devices;

synchronizing means including variable delay means; and means connecting said plurality of devices and said synchronizing means in a closed communication loop;

said variable dealy means operating, for each data rate, to delay data circulating in said loop an integral number of time periods for completion of a circuit around the closed communication loop where a time period is equivalent to the time between successive occurrences of data in a given channel for a given device.

7. Apparatus as claimed in claim 6 comprising in addition:

loop coupling means including a second loop and associated devices connected to said colosed communication loop for extracting data from a given channel of said multiplexed data for transmission to devices on said second loop and for substituting in place of the extracted data further data for circulation in said closed communication loop.

8. Apparatus as claimed in claim 6 wherein said means connecting said plurality of devices is a single cable.

9. The method of communicating between a plurality of time addressable devices having at least two data handling rates and using a minimum of physical connections comprising the steps of:

connecting each of the devices with a single cable in a closed loop system where the data may continuously circulate in a serial data bit multiplexed format divided into data channels;

receiving data at said devices in accordance with a time division address associated therewith and substituting data in the time slot corresponding to said time division address on predetermined periodic bases, the rate of receiving data bits being different for at least one device from remaining devices; and providing a variable delay in said communication loop such that the total delay for each data channel and associated data handling rate is a time interval equal to an integral number of time periods between successive occurrences of data for a given device and for a given data channel.

10. Apparatus as claimed in claim 9 wherein the time slot encompasses a single bit of information and wherein said plurality of devices includes processor means.

11. A communication system incorporating a plurality of time addressable devices, at least two of which have different data handling rates, and a minimum of physical connections comprising, in combination:

means comprising a single cable for connecting each of the devices in a closed loop wherein the data may continuously circulate in a serial data multiplex format divided into data channels;

means for receiving data at each of said devices in accordance with an assignable time division address associated therewith and for substituting data in the time slot corresponding to said time division address on a periodic basis in replacement for the received data, the periodic basis for at least one device being different from remaining devices; and means for providing a variable delay for each data rate in the communication system such that the total delay around the closed loop is a time interval equal to an integral number of time periods between successive occurrences of data for a given device and for a given data channel and associated data handling rate.

* * * * *